US008855723B2

(12) United States Patent
Lynch, III

(10) Patent No.: US 8,855,723 B2
(45) Date of Patent: Oct. 7, 2014

(54) TEMPORAL INCOMING COMMUNICATION NOTIFICATION MANAGEMENT

(76) Inventor: Peter J. Lynch, III, Fredericksburg, VA (US)

( * ) Notice: Subject to any disclaimer, the term of this patent is extended or adjusted under 35 U.S.C. 154(b) by 214 days.

(21) Appl. No.: 13/244,679

(22) Filed: Sep. 25, 2011

(65) Prior Publication Data

US 2013/0077774 A1 Mar. 28, 2013

(51) Int. Cl.
*H04M 1/00* (2006.01)

(52) U.S. Cl.
USPC .......................................... 455/567; 709/206

(58) Field of Classification Search
USPC ......... 379/188, 93.01, 93.02, 210.02, 207.16, 379/142.04
See application file for complete search history.

(56) References Cited

U.S. PATENT DOCUMENTS

| | | | |
|---|---|---|---|
| 6,456,706 B1 | 9/2002 | Blood | |
| 6,882,709 B1* | 4/2005 | Sherlock et al. | 379/90.01 |
| 7,512,662 B2 | 3/2009 | Lyle et al. | |
| 7,650,333 B2 | 1/2010 | Li et al. | |
| 7,814,163 B2 | 10/2010 | Lee | |
| 7,835,294 B2 | 11/2010 | Shuster | |
| 7,922,264 B2* | 4/2011 | Baumann et al. | 303/115.2 |
| 7,925,304 B1* | 4/2011 | Gailloux et al. | 455/563 |
| 7,945,954 B2 | 5/2011 | Coueignoux | |
| 8,160,220 B2* | 4/2012 | Pfleging et al. | 379/142.01 |
| 8,548,152 B2* | 10/2013 | Leister et al. | 379/220.01 |
| 2005/0164720 A1 | 7/2005 | Huang | |
| 2006/0019684 A1 | 1/2006 | Yu et al. | |
| 2007/0211877 A1* | 9/2007 | Martin et al. | 379/210.02 |
| 2008/0114847 A1 | 5/2008 | Ma et al. | |
| 2008/0270540 A1 | 10/2008 | Larsen | |
| 2008/0317229 A1 | 12/2008 | Boss et al. | |
| 2009/0041220 A1* | 2/2009 | Aupperle et al. | 379/207.16 |
| 2009/0086953 A1 | 4/2009 | Vendrow | |
| 2009/0088168 A1 | 4/2009 | Varanasi | |
| 2009/0094333 A1 | 4/2009 | Kyprianou | |
| 2009/0149203 A1 | 6/2009 | Backholm et al. | |
| 2009/0209243 A1 | 8/2009 | Brown | |

(Continued)

FOREIGN PATENT DOCUMENTS

EP 2 091 217 8/2009

OTHER PUBLICATIONS

PRIVACYSTAR, PrivacyStar Announces SMS ID and Directory Assistance for Android; Android Users Can Now ID Unknown Text Messages and Utilize Voice Activated Directory Assistance with Mapping Feature, PR Newswire (U.S.), May 19, 2011.

(Continued)

*Primary Examiner* — Maria El-Zoobi
(74) *Attorney, Agent, or Firm* — Christopher Paul Mitchell

(57) ABSTRACT

Smart phone computer app. The method may include, if a number of an incoming phone call or incoming text message is not temporally allowed, not allowing for notification of the incoming phone call or incoming text according to a normal notification routine and generating a notification of the incoming call or incoming text according to a password-protected masked notification routine of the smart phone, wherein the password-protected masked notification routine of the smart phone includes adding an indication of the incoming phone call or incoming text message to a password-protected phone log or message log of the smart phone and precludes immediately displaying the incoming phone call or incoming text message information on a display of the smart phone, and further precludes adding an indication of the incoming phone call or incoming text message to a default phone log or message log of the smart phone.

20 Claims, 31 Drawing Sheets

(56) References Cited

U.S. PATENT DOCUMENTS

| | | |
|---|---|---|
| 2009/0264116 A1 | 10/2009 | Thompson |
| 2009/0292784 A1 | 11/2009 | Leedberg |
| 2009/0325646 A1* | 12/2009 | Stewart et al. ............... 455/567 |
| 2010/0169448 A1* | 7/2010 | Appelman et al. ............ 709/206 |
| 2010/0208877 A1* | 8/2010 | Meriaz et al. ............ 379/142.04 |
| 2011/0130168 A1 | 6/2011 | Vendrow et al. |
| 2011/0131279 A1 | 6/2011 | Karnik |

OTHER PUBLICATIONS

MBLWARE INC., BlackBook—Hide your contacts and conversations, BlackBerry AppWorld.

Hidden Contacts v1.02 s60v3 s60.

* cited by examiner

TEMPORAL INCOMING COMMUNICATION NOTIFICATION MANAGEMENT

BACKGROUND

1. Field

Embodiments of the present invention relate generally to smartphones. More particularly, embodiments of the present invention relate to temporal incoming communication notification management for smartphones.

2. Description of the Related Art

Smart phones are a part of contemporary life. While capable of traditional voice calls, smart phones offer considerable additional functionality. For example, smart phones can be used to send and receive text messages, surf the Internet, and manage a personal calendar. FIG. 1 is a schematic representation of an exemplary home screen 100 displayed on a display of an exemplary smartphone. The exemplary home screen 100 may be displayed with a notification bar 102 that may communicate information such as phone signal strength via a phone signal strength indicator 104 and the current time 106. The exemplary home screen 100 may also be displayed with a control 108 to launch a menu of, for example, software applications ("apps") executable by the smart phone.

Even in conjunction with traditional voice calls, smart phones offer extended capabilities relative to their land-based predecessors. For example, according to a default notification routine of a smartphone, incoming phone calls are visually indicated on a display of the smart phone. FIG. 2 is a schematic representation of an exemplary visual indication 200 of an incoming call on the smartphone display. As shown in FIG. 2, the exemplary visual indication includes, among other items, an indication of the phone number 202 of an incoming phone call (and data associated therewith such as a caller's name 204 or picture/icon 206). As further shown in FIG. 2, the notification bar 102 also includes a missed incoming call notification 208 indicating another earlier phone call that was not answered. Incoming phone calls may be additionally indicated with a ring tone or alternatively the smartphone may vibrate to quietly indicate the call. Incoming calls, whether answered or not, are be automatically logged in a call log making it easier for a user to see calls received by the smart phone. FIG. 3 is a schematic representation of an exemplary call log 300 of the smartphone of FIG. 1. As shown in FIG. 3, the exemplary call log 300 includes a list of the phone numbers (or data associated therewith such as names 302), duration 308, and timestamp 310 for answered calls 304, missed calls, and outgoing calls 306.

According to the default notification routine of the smart phone, text messages are handled similarly to voice calls. Incoming text messages may be visually indicated on the display of the smart phone. FIG. 4 is a schematic representation of an exemplary visual indication 400 of an incoming text message on the smartphone display. As shown in FIG. 4, the exemplary visual indication 400 of the incoming text message is displayed as temporarily appearing text in the notification bar 102. Thereafter, a text message notification such as a message icon (similar to the missed incoming call notification 208) is displayed on the notification bar 102. Incoming text messages may also be audibly indicated with an audible alert or alternatively the phone may vibrate to quietly indicate the incoming text message. Incoming text messages are automatically logged to a message log from which a user may access the text message for review and response (i.e., messages are placed within or made accessible from an inbox). FIG. 5 is a schematic representation of an exemplary message log 500 of the smart phone of FIG. 1. The exemplary message log 500 includes a list of both unread text messages (i.e., new text messages) and read text messages 502. Upon selecting a text message 502, a user may read the entire contents of that text message 502 and may respond thereto.

Despite the extended notification capabilities of smart phones, additional notification options are desirable.

BRIEF SUMMARY

According to an aspect of the invention, a method of a smart phone including a processor, a memory coupled to the processor, and a display. The method may include receiving into a user interface of the smart phone, indications of temporally authorized or unauthorized phone numbers, receiving into the user interface of the smart phone, indications of time periods during which the temporally authorized or unauthorized phone numbers are temporally authorized or unauthorized, generating a list of temporally authorized or unauthorized phone numbers and time periods based on said received indications of temporally authorized or unauthorized phone numbers and time periods, storing the list of temporally authorized or unauthorized phone numbers and time periods in the memory of the smart phone, and comparing, using instructions executed by the processor of the smart phone, phone numbers and times of incoming phone calls and incoming text messages against the list of temporally authorized or unauthorized phone numbers and time periods. If a number of an incoming phone call or incoming text message and is temporally allowed, the method may include allowing for notification of the incoming phone call or incoming text messages according to a default notification routine of the smart phone. If the number of the incoming phone call or incoming text message is not temporally allowed, the method may include not allowing for notification of the incoming phone call or incoming text according to the normal notification routine and generating a notification of the incoming call or incoming text according to a password-protected masked notification routine of the smart phone. The default notification routine of the smart phone may include immediately displaying incoming phone call or incoming text message information on the display of the smart phone and adding an indication of the incoming phone call or incoming text message to a default phone log or message log of the smart phone. The password-protected masked notification routine of the smart phone may include adding an indication of the incoming phone call or incoming text message to a password-protected phone log or message log of the smart phone and preclude immediately displaying the incoming phone call or incoming text message information on the display of the smart phone, and further preclude adding an indication of the incoming phone call or incoming text message to a default phone log or message log of the smart phone.

The foregoing and other aspects will become apparent from the following detailed description when considered in conjunction with the accompanying drawing figures.

DETAILED DESCRIPTION

Figure 1:
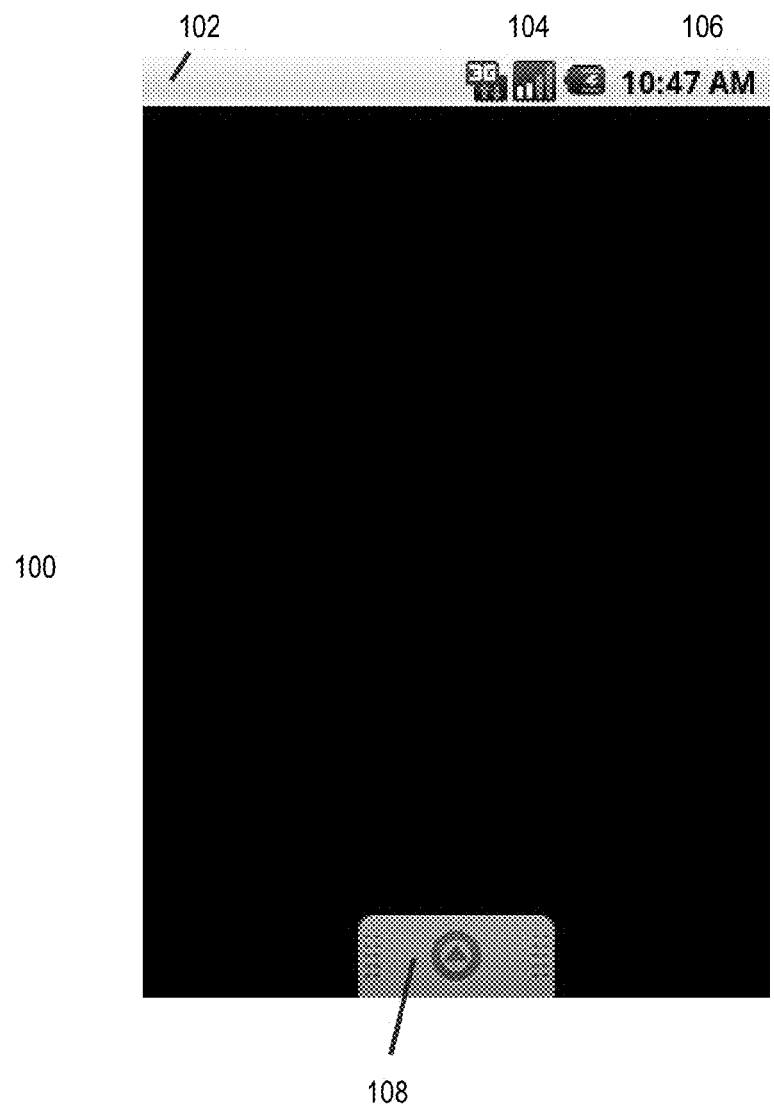
FIG. 1 is a schematic representation of an exemplary home screen 100 displayed on a display of an exemplary smartphone.
Figure 2:
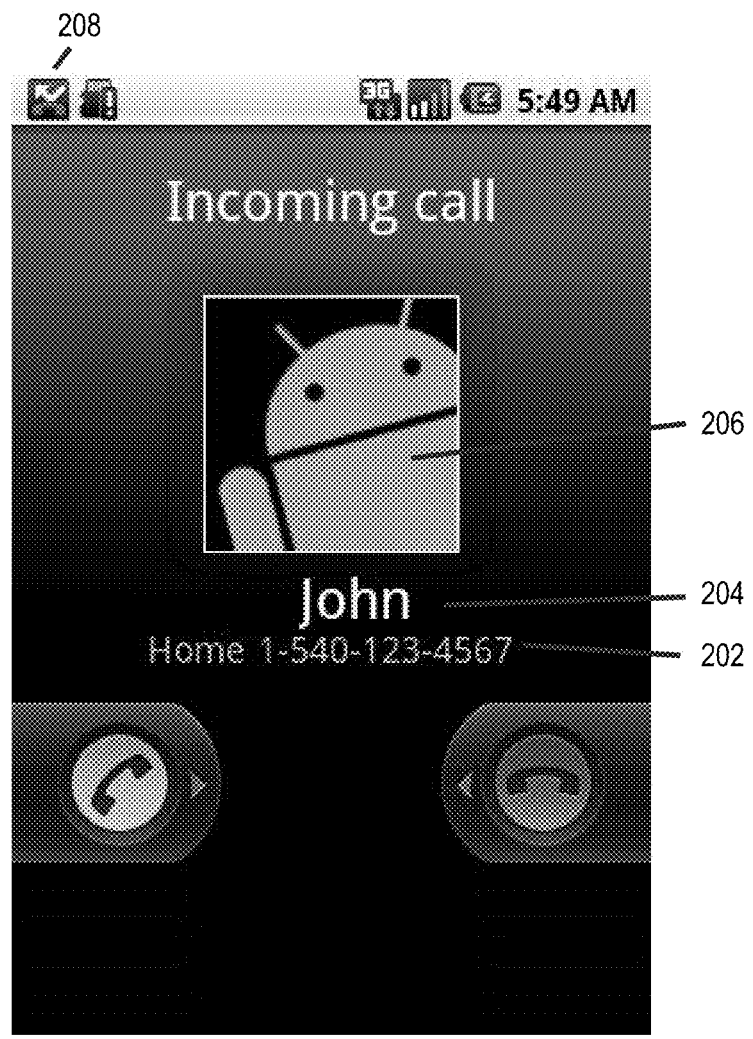
FIG. 2 is a schematic representation of an exemplary visual indication 200 of an incoming call on the smartphone display.
Figure 3:
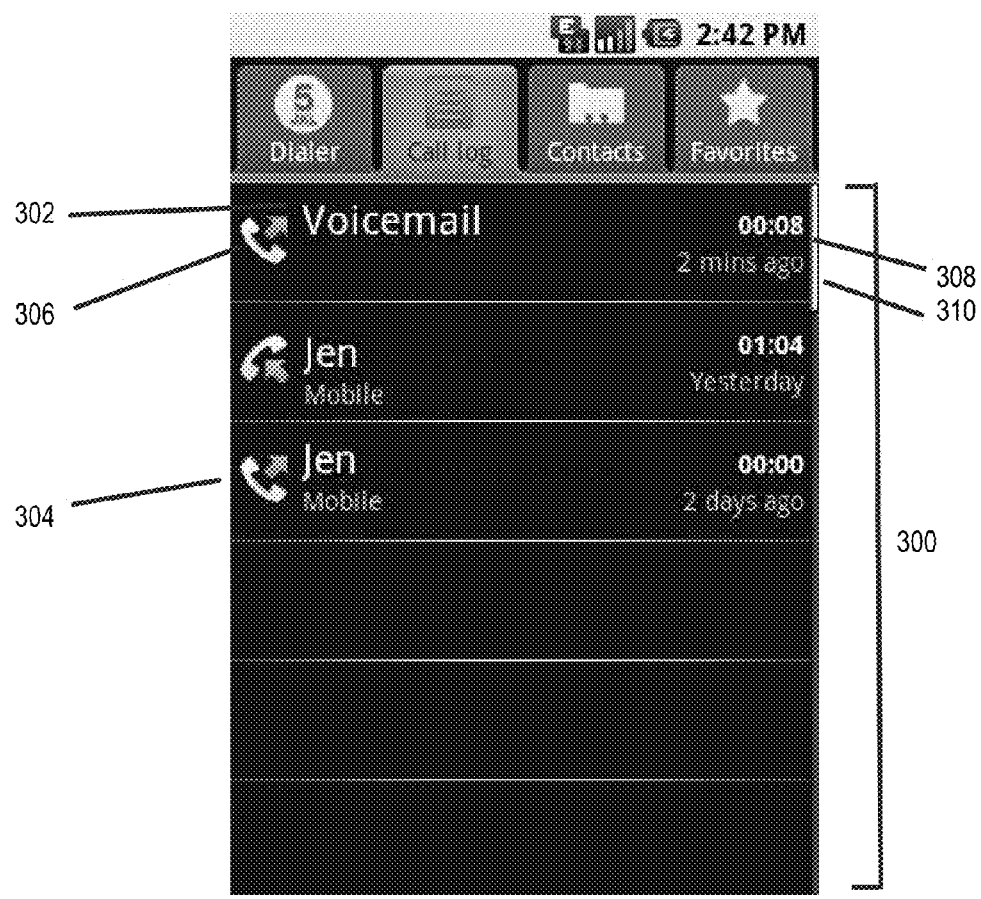
FIG. 3 is a schematic representation of an exemplary call log 300 of the smartphone of FIG. 1.
Figure 4:
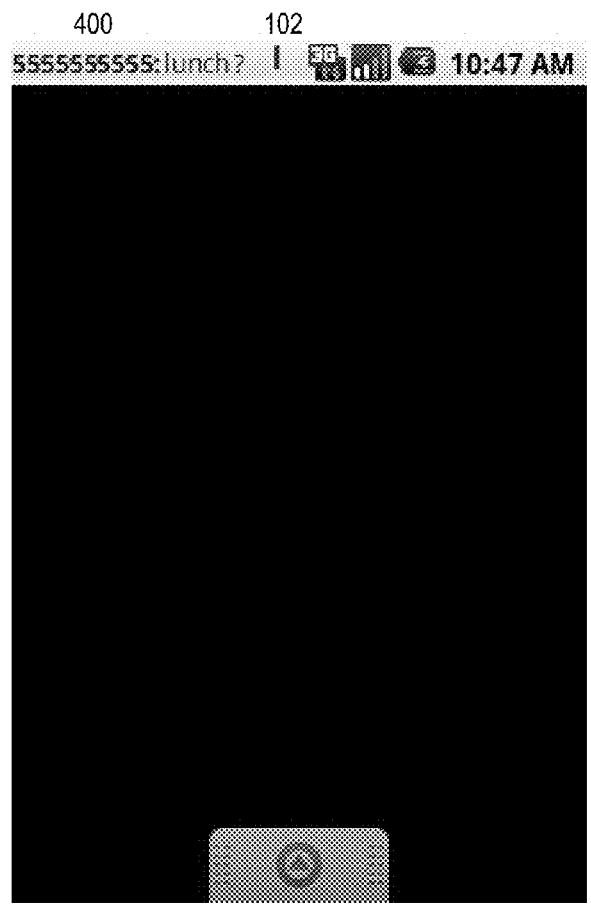
FIG. 4 is a schematic representation of an exemplary visual indication 400 of an incoming text message on the smartphone display.
Figure 5:
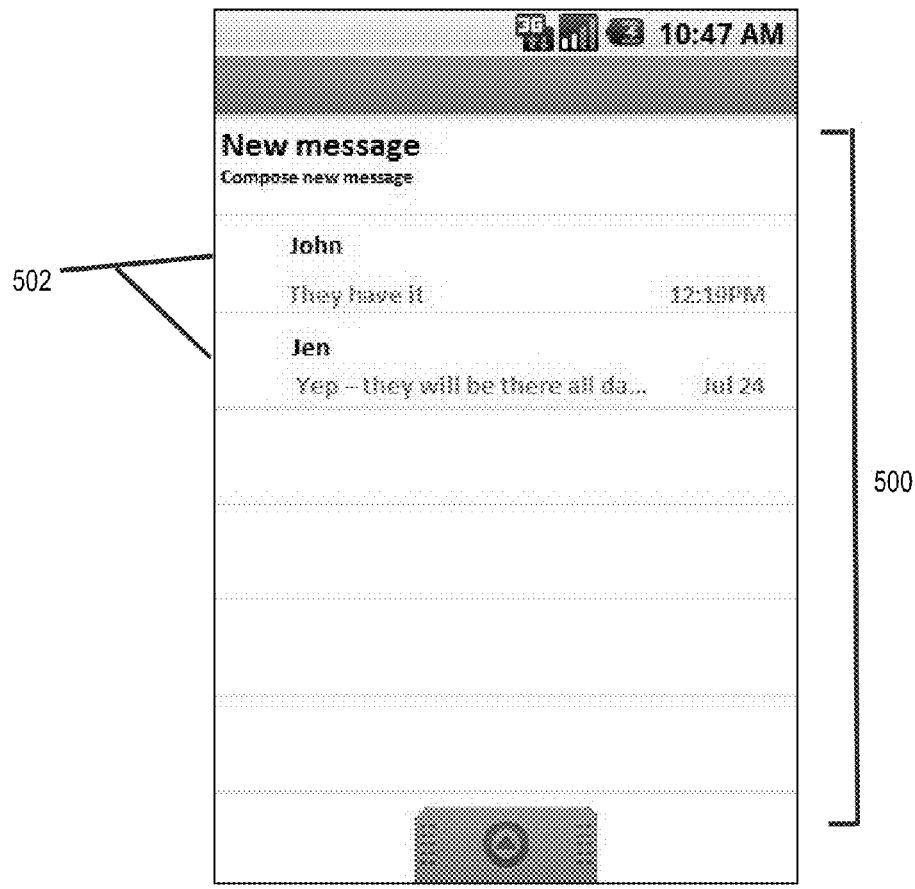
FIG. 5 is a schematic representation of an exemplary message log 500 of the smart phone of FIG. 1.

Reference will now be made in detail to embodiments of the present invention, examples of which are illustrated in the accompanying drawings, wherein like reference numerals refer to the like elements throughout. The embodiments are described below to explain the present invention by referring to the figures.

"As used in the description of this application, the terms "a", "an" and "the" may refer to one or more than one of an element (e.g., item or act). Similarly, a particular quantity of an element may be described or shown while the actual quantity of the element may differ. The terms "and" and "or" may be used in the conjunctive or disjunctive sense and will generally be understood to be equivalent to "and/or". Elements from an embodiment may be combined with elements of another. No element used in the description of this application should be construed as critical or essential to the invention unless explicitly described as such. Further, when an element is described as "connected," "coupled," or otherwise linked to another element, it may be directly linked to the other element, or intervening elements may be present."

For a variety of reasons, a user of a smartphone may desire certain incoming phone calls and text messages not to be handled according to a default notification routine of the smartphone (or conversely that only certain incoming phone calls or text messages are handled according to the default notification routine). While call blocking, message filtering, and even some examples of contact privacy have been disclosed in the art, a user may desire temporal management of incoming phone calls and text messages.

In one example, a user (e.g., an undercover police officer) may during a time period be in certain company (e.g., with a criminal suspect) that the user may not want to know of phone calls or text messages from a particular entity (e.g., a phone call from the police station). Simply turning the ringer off of the smartphone off may not be enough. For example, even if the ringer is off, the criminal suspect may get the opportunity to browse the phone and may see the police station in the undercover police officer's call log.

In another example, a user may not wish to receive even notifications of phone calls or text messages with the exception of calls or text messages from a specific person (e.g., the user's babysitter) during a time period (e.g., while on a date with the user's spouse). If the user leaves the phone off, the babysitter cannot get through. If the user leaves the phone on, the user may still receive notifications of phone calls or text messages either by, for example, a visual indication on the screen, or by reviewing a call log to check for missed calls from the babysitter. While such may seem minor, such an unwanted notification may cause stress and anxiety, and may negatively impact the user's date. For example, if a notification indicates the user's work place is trying to reach the user, such a notification may cause stress and anxiety.

In yet another example, an entity (e.g., a corporation) may desire for users of entity-provided phones (e.g., employees) only to receive phone calls and text messages from particular people (e.g., other employees) during one time period (e.g., during work hours). The entity may desire for users not to receive any phone calls or text messages during another time period (e.g., during non-work hours). If the entity requests users to turn in their phones at the end of the day, keeping track of phones may become burdensome. Further, limiting users of entity-provided phones to receive phone calls and text messages from particular people may be difficult.

Accordingly, temporal management of incoming phone calls and text messages according to a password-protected masked notification routine is needed for smart phones. That is, incoming calls and texts may be filtered to either be delivered according to a default notification routine or according to the password-protected masked notification routine. Filtering may be based on a time and date and on a phone number of an incoming phone call or text message.

Figure 6:
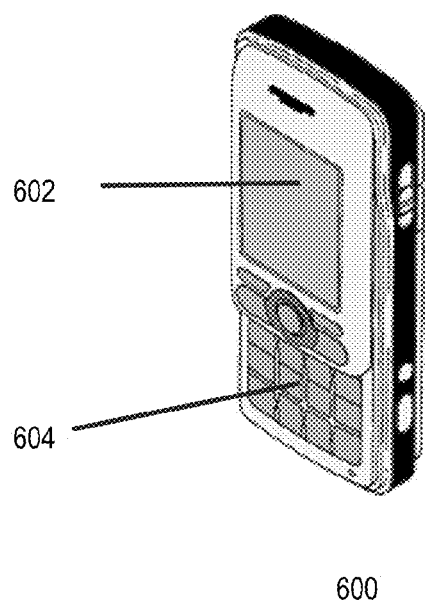
FIG. 6 is a schematic representation of an exemplary smartphone 600.

FIG. 6 is a schematic representation of an exemplary smartphone 600. The smart phone may include a display 602 (that may function as a user interface such as a touchscreen), a user interface 604, a processor, a memory coupled to the processor, a transmitter, and a receiver. The smartphone described herein may be a smart phone running an Android-based operating system from Google Inc. The smartphone may be any appropriate device. For example, the smartphone may be an IPhone smartphone from Apple Inc. or a BlackBerry smartphone from Research In Motion Limited. Further, because the smartphone 600 is described in the context of an Android-based operating system, the embodiments are described with reference to, for example, activities. The principles and spirit of the invention may be implemented in alternative structures, modules, or the like, now known or later developed, causing a computing device to operate according to computer program instructions.

Figure 7:
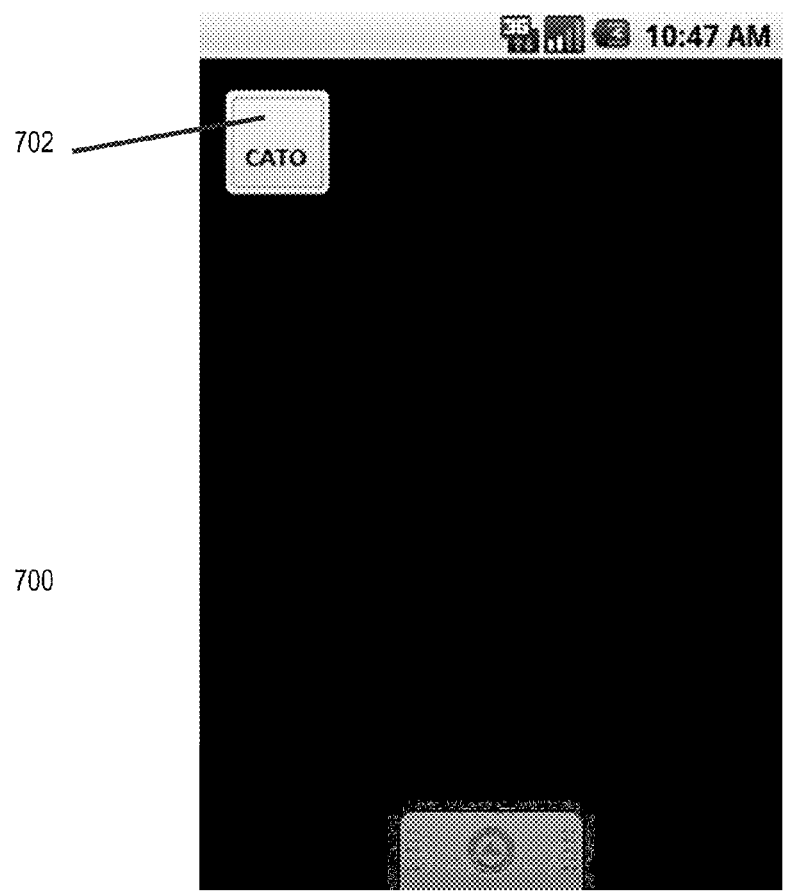
FIG. 7 is a schematic representation of an exemplary home screen 700 displayed on a display of the smartphone 600 of FIG. 6.

FIG. 7 is a schematic representation of an exemplary home screen 700 displayed on a display of the smartphone 600 of FIG. 6. The home screen 700 may include an icon 702 for launching a temporal incoming communication notification management app according to an embodiment of the present invention. Alternatively, a specific key sequence (e.g., inputting a specific sequence of characters) or screen swipe pattern (e.g., moving a finger in a specific pattern on the touch screen) could be used to launch the temporal incoming communication notification management app. In a further exemplary embodiment, an icon for launching the temporal incoming communication notification management app may periodically (e.g., monthly or manually) change in appearance so as to be less detectable of the app to people other than the user.

The user may, for example, pay a fee to receive automatically changing icons or new icons. In yet another exemplary embodiment, a combination of changing icons, specific key sequences, and screen swipes may be used in an attempt to lessen the detectability of the app to people other than the user. The incoming communication notification management app may be stored in the memory of the smartphone 600. The memory of the smart phone may include, for example, a built-in memory device or an removable memory device. In this exemplary embodiment, the incoming communication notification management app may run entirely on the smartphone 600.

During the launch of the temporal incoming communication notification management app, the user may be prompted to enter a password which may be checked similarly as described below with respect to the password for logs activity. During the launch of the temporal incoming communication notification management app, a splash file may be displayed, for example, a splash screen may be displayed and contacts from the smartphone's contact list may be retrieved. The temporal incoming communication notification management app may include a database. The database may include a masked list table, a messages received table, a calls received table, a password table, and an allowed list table. When the contacts from the smartphone's contact list are retrieved, the masked list table and allowed list table may be synchronized with the contacts from the smartphone's contact list. The launch may complete with the start of a main activity of the temporal incoming communication notification management app.

Figure 8:
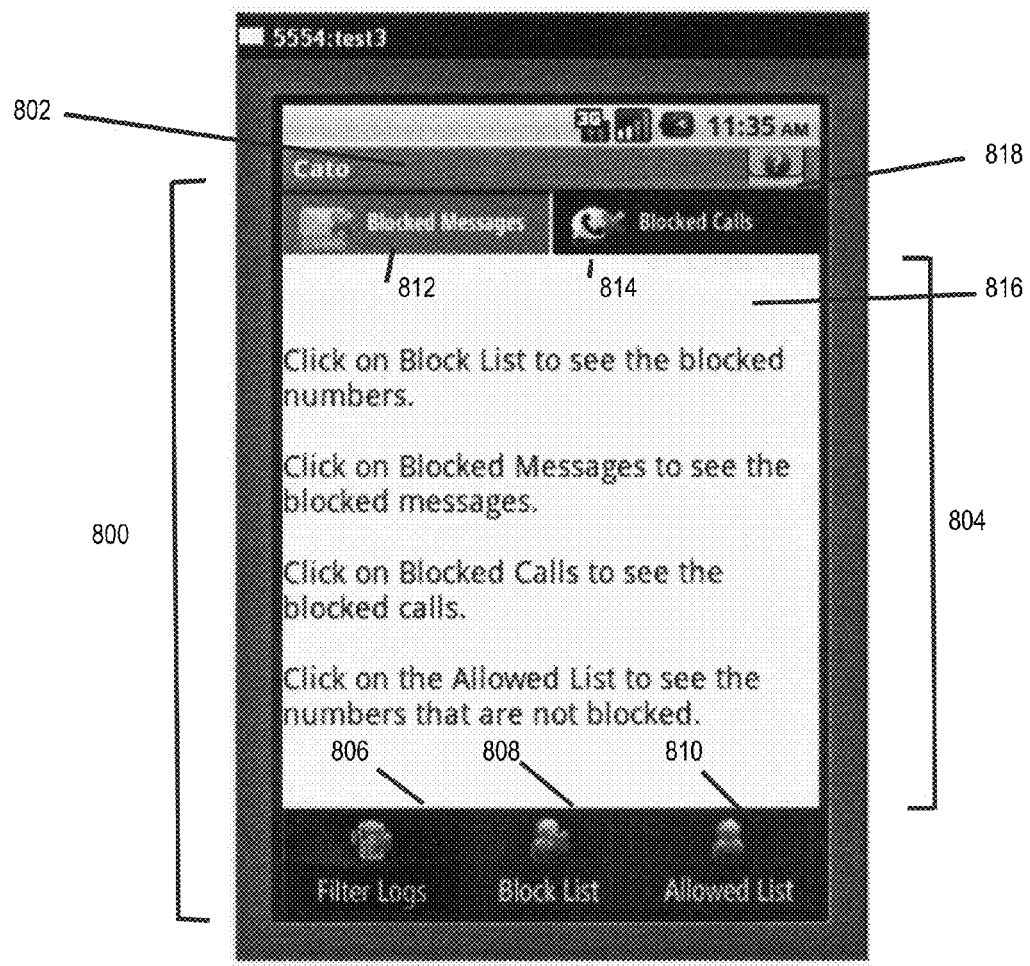
FIG. 8 is a schematic representation of a main user interface 800 of a temporal incoming communication notification management app according to an exemplary embodiment of the present invention.

In the main activity, a main user interface may be displayed. FIG. 8 is a schematic representation of a main user interface 800. The main user interface 800 may include a title bar 802, a main screen 804, a filter logs tab 806, a blocked (or "masked") list tab 808, and an allowed list tab 810. The filter logs tab 806 may be in a selected state, and the main screen 804 may include a blocked (or "masked") messages button 812, a blocked (or "masked") calls button 814, and a display area 816. The title bar 802 may include a help button 818. It should be noted that call and message data may not be actually blocked, but may instead be received by the smartphone 600 and masked or hidden. It may be certain notifications of call and message data that are, in a sense, blocked.

Upon selecting the masked messages button 802 for the first time, or upon selecting the masked calls button 804 for the first time, a set password activity may start. Otherwise, upon selecting the masked messages button 802, or upon selecting the masked calls button 804, a password for logs activity may start.

In the set password activity, the user may enter a password, confirm that password and press an OK button. The password may then be stored in the password table in the database. The password may be encrypted using a password encryption activity before it is stored in the database.

Figure 9:
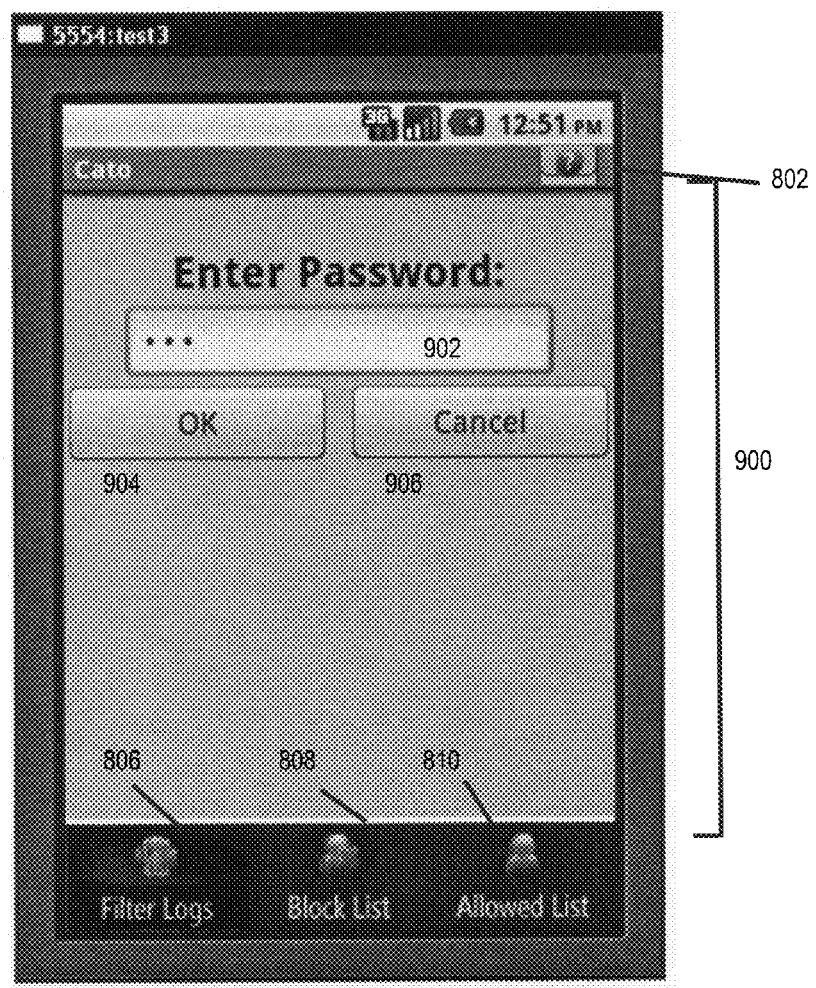
FIGS. 9-16 are schematic representations of screens and dialogs of the temporal incoming communication notification management app of claim 8.

In the password for logs activity, a password screen may be displayed. FIG. 9 is a schematic representation of an exemplary password screen 900. The password screen 900 may be displayed with the title bar 802, the filter logs tab 806, the masked list tab 808, and the allowed list tab 810. The password screen 900 may include an input field 902 for receiving a password from a user. The password screen 900 may further include an OK button 904 and a cancel button 906. When a user enters a password into the input field 902 and selects the OK button 904, the entered password may be checked against the encrypted password stored in the database. The password in the database may be decrypted before comparing it with the password entered by the user. If the passwords match, a messages from database activity may be started (if the masked messages button 812 was selected) or a calls from database activity may be started (if the masked calls button 814 was selected). It should be noted that two levels of password protection have now been discussed: (1) during the launch of the temporal incoming communication notification management app, and (2) during the password for logs activity. These passwords may be the same or different.

Figure 10:
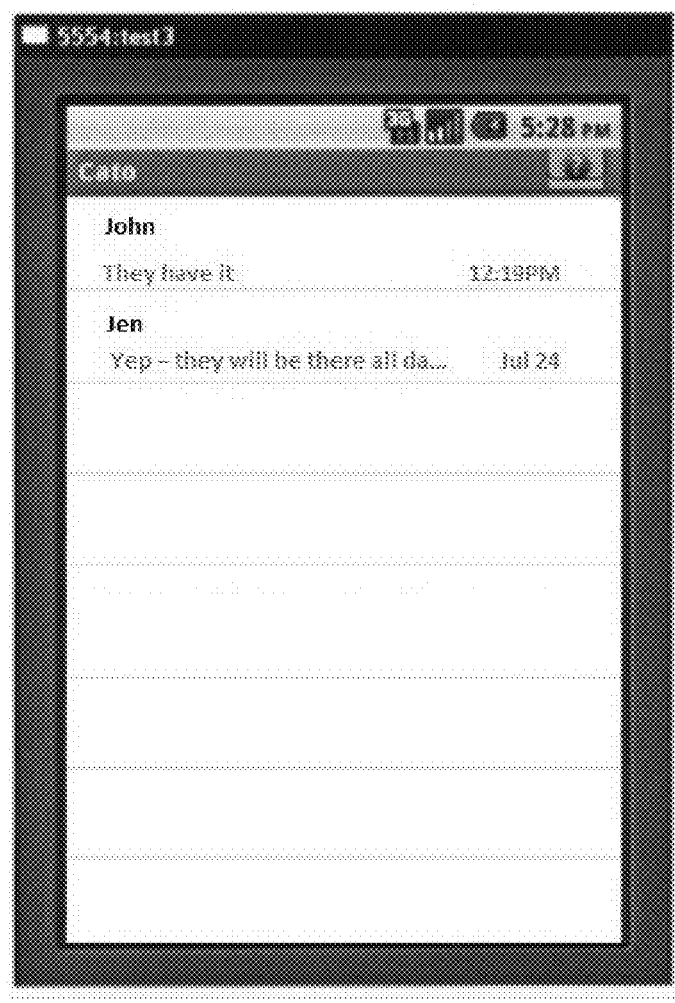

In the messages from database activity, a masked messages screen may be displayed. FIG. 10 is a schematic representation of an exemplary masked messages screen. The masked messages screen may include a list of both unread text messages (i.e., new text messages) and read text messages. The text messages may include SMS messages. As discussed an another exemplary embodiment below, the text messages may include MMS messages. The principles and spirit of the invention may be implemented for masking other types of communications (e.g., other picture types, video types, etc.) that are now known or later developed. Upon selecting a text message, the text message may be retrieved from the messages received table of the database and the user may read the entire contents of that text message and may respond thereto.

Figure 11:

In the calls from database activity, a masked calls screen may be displayed. FIG. 11 is a schematic representation of an exemplary masked calls screen. The masked calls screen may include a list of the phone numbers (or data associated therewith such as names and timestamps). The phone numbers (or data associated therewith such as names and timestamps), may be retrieved from the calls received table of the database. Alternatively, upon selecting a phone number (or data associated therewith such as a name), details of the respective number (e.g., a timestamp) may be retrieved from the database and displayed.

Figure 12:
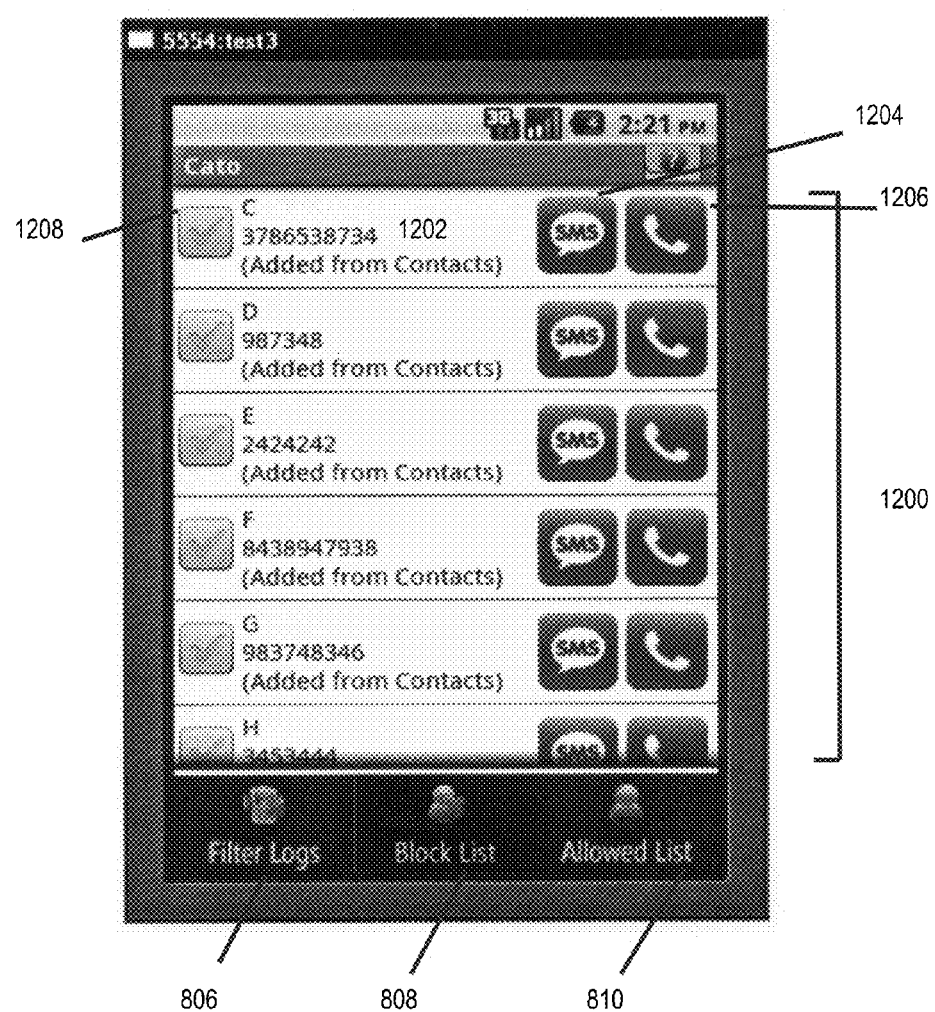

Upon selecting the masked list tab 808, a masked contacts activity may start. In the masked contacts activity, a masked contacts screen may be displayed. FIG. 12 is a schematic representation of an exemplary masked contacts screen 1200. The masked contacts screen 1200 may be displayed with the title bar 802, the filter logs tab 806, the masked list tab 808, and the allowed list tab 810. The masked contacts screen 1200 may include a list of phone numbers 1202 that may be temporally masked from visual display of messages, calls, or both messages and calls. The phone numbers 1202 may be stored in the masked list table in the database. The masked contacts activity may retrieve all of the phone numbers 1202 stored in the masked list table of the database and display the phone numbers 1202. For each phone number 1202, the masked contacts screen 1200 may further include a text mask button 1204, a call mask button 1206, and a select button 1208. Text mask buttons 1204 and call mask buttons 1206 may be red or green in color. The select button may contain a green checkmark if selected, or a faded checkmark if not selected.

If a text mask button 1204 is green, notification of incoming text messages from that phone number 1202 may occur according to a default notification routine of the smart phone. Similarly, if a phone mask button 1206 is green, notification of incoming phone calls from that phone number 1202 may occur according to a default notification routine.

If a text mask button 1204 is red, during a specified period, notification of text messages from that phone number 1202 may occur according to a password-protected masked notification routine. Similarly, if a mask block button 1206 is red, during a specified period, notification of phone calls from that phone number 1202 may occur according to a password-protected masked notification routine.

A sms receiver activity and a call receiver activity may run to compare the phone number phone 1202 and time of an incoming phone call or an incoming text message against the allowed list and the masked list. Depending on the result of such comparison, notification of the text message or phone call from the phone number 1202 may occur according to either the default notification routine or the password-protected masked notification routine. The time of the incoming phone call or incoming text message may include a calendar date.

A default notification routine may include immediately displaying incoming phone call or incoming text message information on the display of the smart phone and adding an indication of the incoming phone call or incoming text message to a default phone log or message log of the smart phone.

The password-protected masked notification routine of the smart phone may include adding an indication of the incoming phone call or incoming text message information to a password-protected phone log or message log of the smart phone and may not include immediately displaying the incoming phone call or incoming text message information on the display of the smart phone, and further may not include adding an indication of the incoming phone call or adding the incoming text message to a default phone log or message log of the smart phone. The password-protected masked notification routine of the smartphone may further not include audible indication of the incoming phone call or incoming text message (e.g., the phone may not ring or a message or call notification may not sound). The indication of the incoming phone call or incoming text message may be added as an entry to the calls received table or message received table of the database. With respect to incoming phone calls, they are not blocked from receipt, but instead are transferred to voicemail without any notification of receipt of the voicemail (e.g., tone indication if a user is currently talking on the phone). It should again be noted that data in the calls received table and in the message received table may be password protected.

For a given phone number 1202, the text mask button 1204, the phone mask button 1206, or both the text mask button 1204 and call mask button 1206 may be red. In other words, a phone number may be temporally masked from visual display for incoming phone calls and incoming text messages independently. If both the text mask button 1204 and the phone mask button 1206 are green for a particular phone number, that phone number may be removed from the masked list table in the database.

Figure 13:
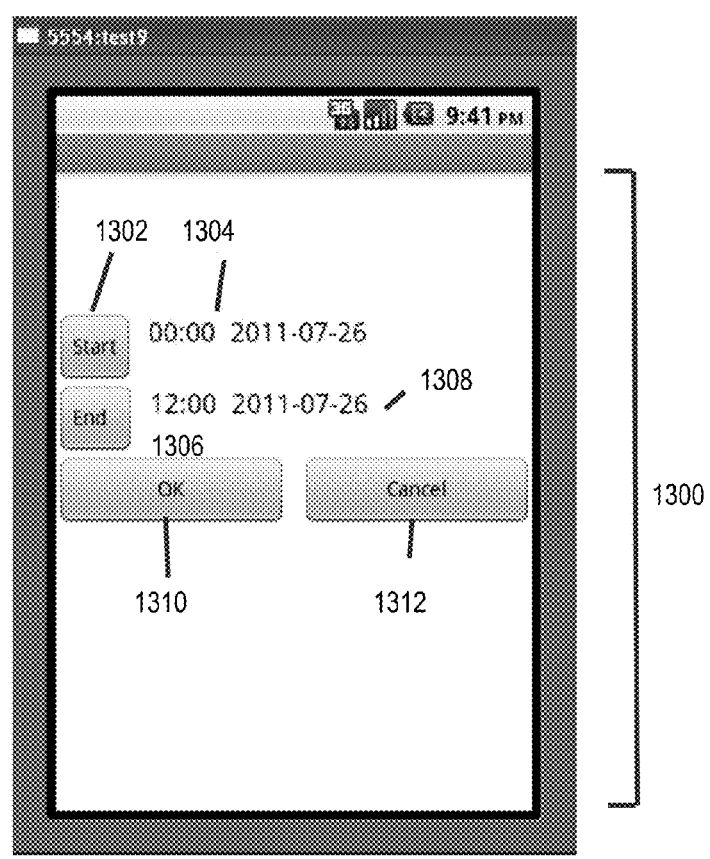

Upon selecting a text mask button 1204 or a phone mask button 1206, a set temporal mask activity may start. In the set temporal mask activity, a set temporal mask screen may be displayed. FIG. 13 is a schematic representation of an exemplary set temporal mask screen 1300. The set temporal mask screen 1300 may include temporal mask start button 1302, a temporal mask start date and time indicator 1304, a temporal mask end button 1306, a temporal mask end date and time indicator 1308, an OK button, and a cancel button 1312.

When the temporal mask start button 1302 is selected, the temporal mask start date and time indicator 1304 may receive a temporal mask start date and time input from the user. When the temporal mask end button 1306 is selected, the temporal mask end date and time indicator 1308 may receive a temporal mask start date and time input from the user. The temporal mask start and end time and date indicators 1304, 1308 may indicate the starting time and ending time. During the specified period, notifications of either incoming phone calls or text messages from the phone number 1202 may occur according to the password-protected masked notification routine. If a user does not enter temporal mask start and end times and dates, notifications of either incoming phone calls or text messages from the phone number 1202 may be continuously according to the password-protected masked notification routine.

During the masked contacts activity, a user may select a menu button from a keypad of the smart phone. A list of menu items may be displayed. The list of menu items may include an add from contacts menu item, an add manually menu item, an add from call log menu item, an add from message log menu item, and a mark all/clear all menu item. The add from contacts menu item may be selected to add contacts from the smart phone's contact list to the masked list table in the database. The add manually menu item may be selected to add a contact manually to the masked list table. The add from call log menu item may be selected to add contacts from the smart phone's call log. The add from message log menu item may be selected to add contacts from the smart phone's message log. The mark all/clear all menu item may be selected to select all or deselect all contacts.

Figure 14:
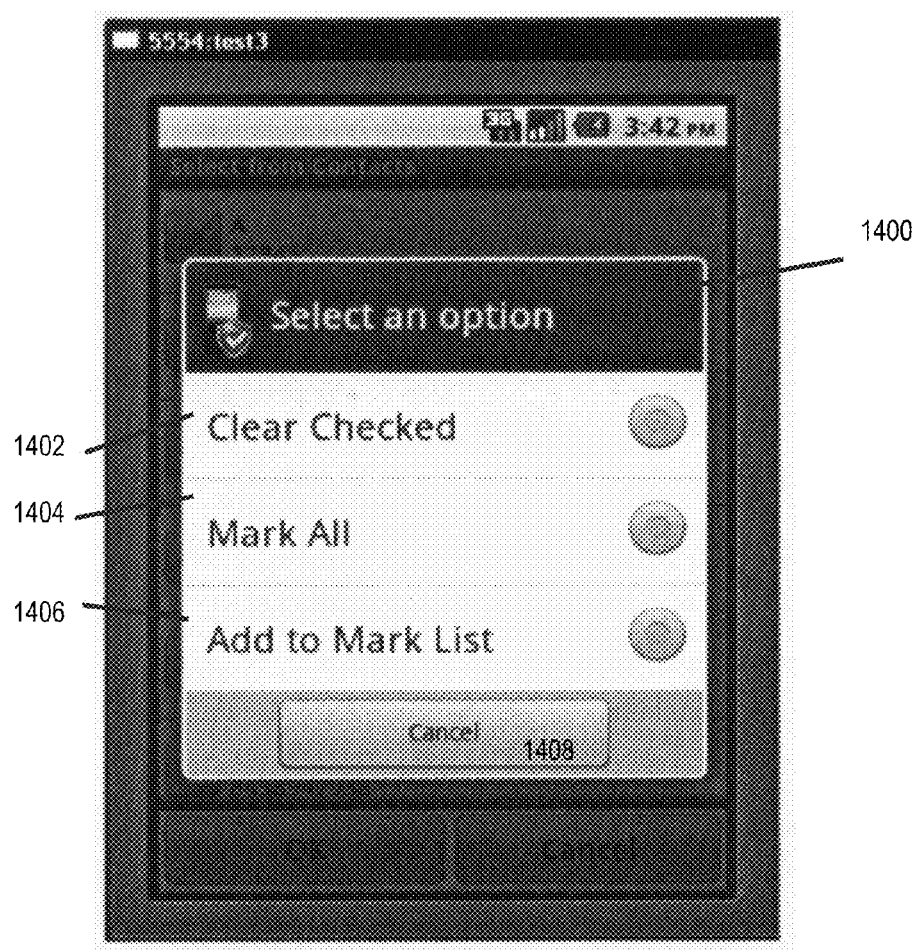

Upon selecting the add from contacts menu item, an add from contacts activity may start, and all contacts from the smart phone's contact list may be displayed. From this list of contacts, one or more contacts may be selected and added to the masked list table. Upon selection of a contact, an add from contacts dialog may be displayed. FIG. 14 is a schematic representation of an exemplary add from contacts dialog 1400. The add from contacts dialog 1400 may include a clear checked menu item 1402, a mark all menu item 1404, an add to mark list menu item 1406, and a cancel button 1408. Upon selecting the add to mark list menu item 1406, a temporal mask start and end date and time may be entered and the contact may be selected for inclusion in the masked list table of the database. Upon selecting the mark all list menu item 1404, all contacts may be selected for inclusion in the masked list table of the database. Upon selecting the clear checked menu item 1402, the contact may be deselected for inclusion in the masked list table of the database.

Upon selecting the add manually menu item, an add manually activity may start. During the add manually activity, a user may enter a number manually and a temporal mask start and end date and time may be entered that will be added to the masked list table of the database.

Upon selecting the add from call log menu item, an add from call log activity may start, and all contacts from the smart phone's call log may be displayed. From this list of contacts, one or more contacts may be selected and added to the masked list table similarly to contacts being selected and added during the add from contacts activity.

Upon selecting an add from message log menu item, an add from message log activity may start, and all contacts from the smart phone's message log may be displayed. From this list of contacts, one or more contacts may be selected and added to the masked list table similarly to contacts being selected and added during the add from contacts activity.

Figure 15:
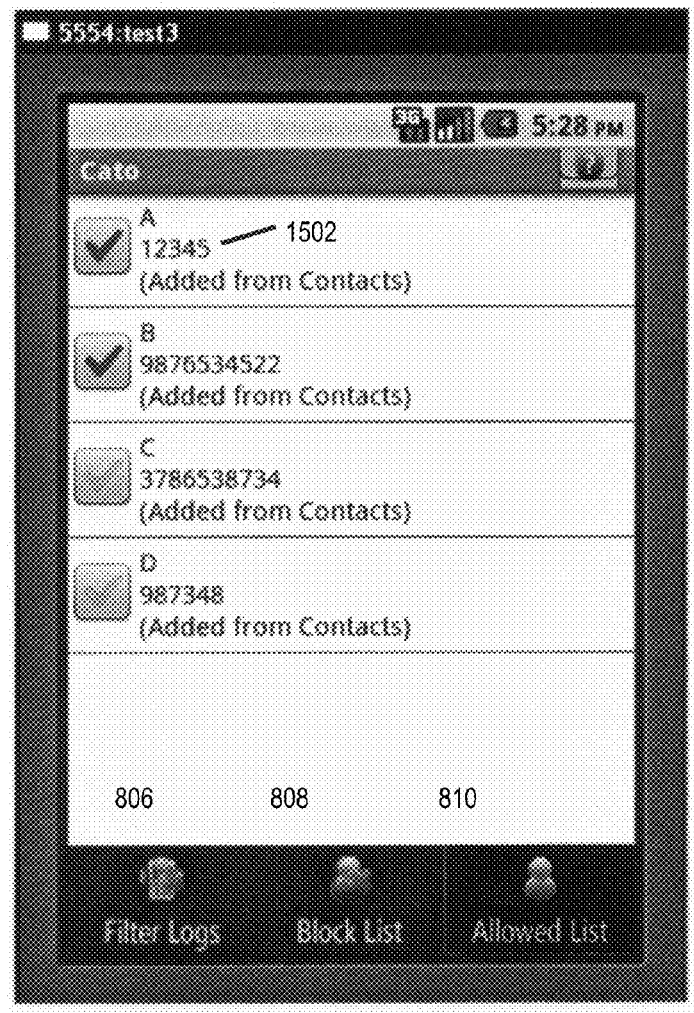

Upon selecting the allowed list tab 810, an allowed list activity may start. In the allowed list activity, an allowed contacts screen may be displayed. FIG. 15 is a schematic representation of an exemplary allowed contacts screen 1500. The allowed contacts screen 1500 may be displayed with the title bar 802, the filter logs tab 806, the masked list tab 808, and the allowed list tab 810. The allowed contacts screen 1500 may include a list of phone numbers 1502 that may not be temporally masked from receiving either messages or calls. A number is an allowed number if it is not included in the masked list table of the database. Each phone number 1502 in the allowed list table of the database is checked against the masked list table of the database. If a phone number is found on the masked list table of the database, it may not be included on the list of phone numbers that may not be temporally masked from receiving either messages or calls. For each phone number 1502, the allowed contacts screen 1500 may include a select button 1504. The select button 1504 may contain a green checkmark if selected, or a faded checkmark if not selected.

Figure 16:
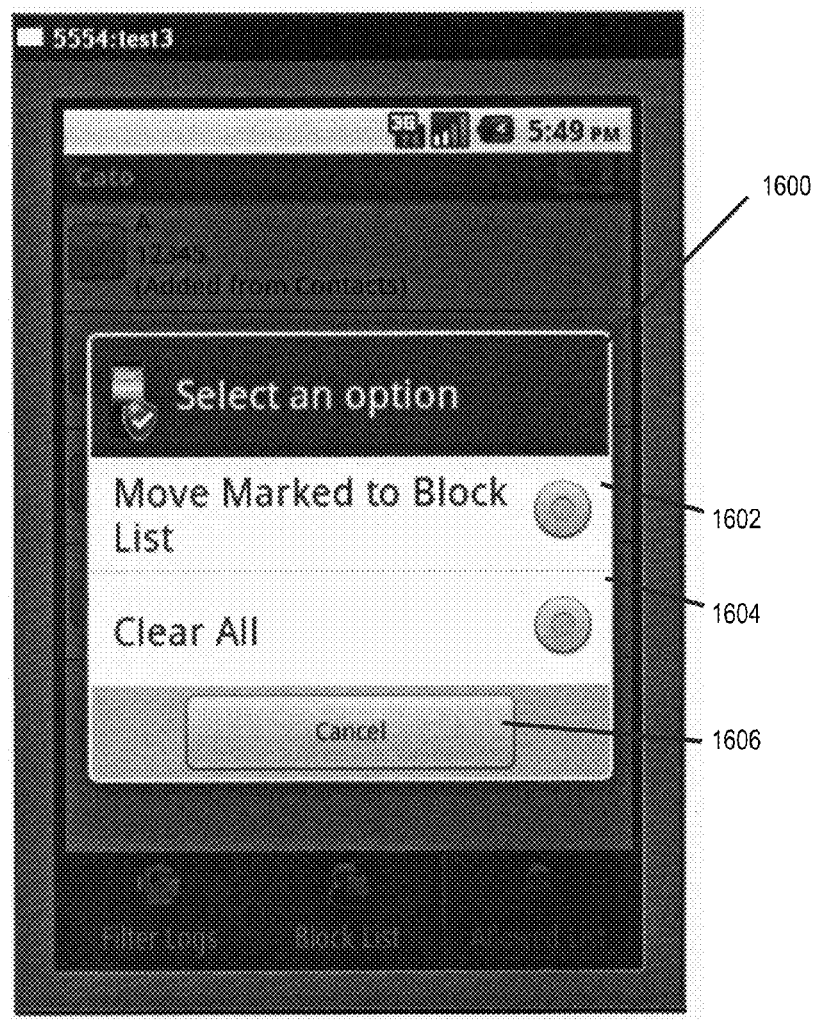

Upon selecting a select button 1504, a modify allowed dialog may be displayed. FIG. 16 is a schematic representation of an exemplary modify allowed dialog 1600. The modify allowed dialog 1600 may include a move marked to masked list menu item 1602, a clear all menu item 1604, and a cancel button 1606. Upon selecting the move marked to masked list menu item 1602, the selected phone number may be removed from the allowed list table and added to the masked list table and may no longer be displayed on the allowed contacts screen 1500. Upon selecting the clear all menu item, all select buttons 1504 for all phone numbers 1502 displayed on the allowed contacts screen 1500 may be marked not selected (e.g., show a faded check mark).

During the allowed contacts activity, a user may select a menu button from a keypad (i.e., a user interface) of the smart phone. A list of menu items may be displayed. The list of menu items may include an add from contacts menu item, an add from call log menu item, an add from message log menu item, and a mark all/clear all menu item. The add from contacts menu item may be selected to add contacts from the smart phone's contact list to the allowed list table in the database. The add from call log menu item may be selected to add contacts from the smart phone's call log. The add from message log menu item may be selected to add contacts from the smart phone's message log. The mark all/clear all menu item may be selected to select all or deselect all contacts.

Upon selecting the add from contacts menu item, an add from contacts activity may start, and all contacts from the smart phone's contact list may be displayed. From this list of contacts, one or more contacts may be selected and added to the allowed list table.

Upon selecting the add from call log menu item, an add from call log activity may start, and all contacts from the smart phone's call log may be displayed. From this list of contacts, one or more contacts may be selected and added to the allowed list table similarly to contacts being selected and added during the add from contacts activity.

Upon selecting an add from message log menu item, an add from message log activity may start, and all contacts from the smart phone's message log may be displayed. From this list of contacts, one or more contacts may be selected and added to the allowed list table similarly to contacts being selected and added during the add from contacts activity.

Upon selecting the help button 818, a show help activity may be launched, and a help dialog may be displayed. The contents of the help dialog may vary depending on an activity that is active when the show help activity is launched.

FIGS. 17-25 are schematic representations of a temporal incoming communication notification management app according to another exemplary embodiment. Certain elements may be similar to the above exemplary embodiment and a discussion thereof is omitted in the interest clarity. Instead, only some similar elements are discussed along with certain differences. In this exemplary embodiment, temporal time periods may be managed through the use of profiles.

Figure 17:
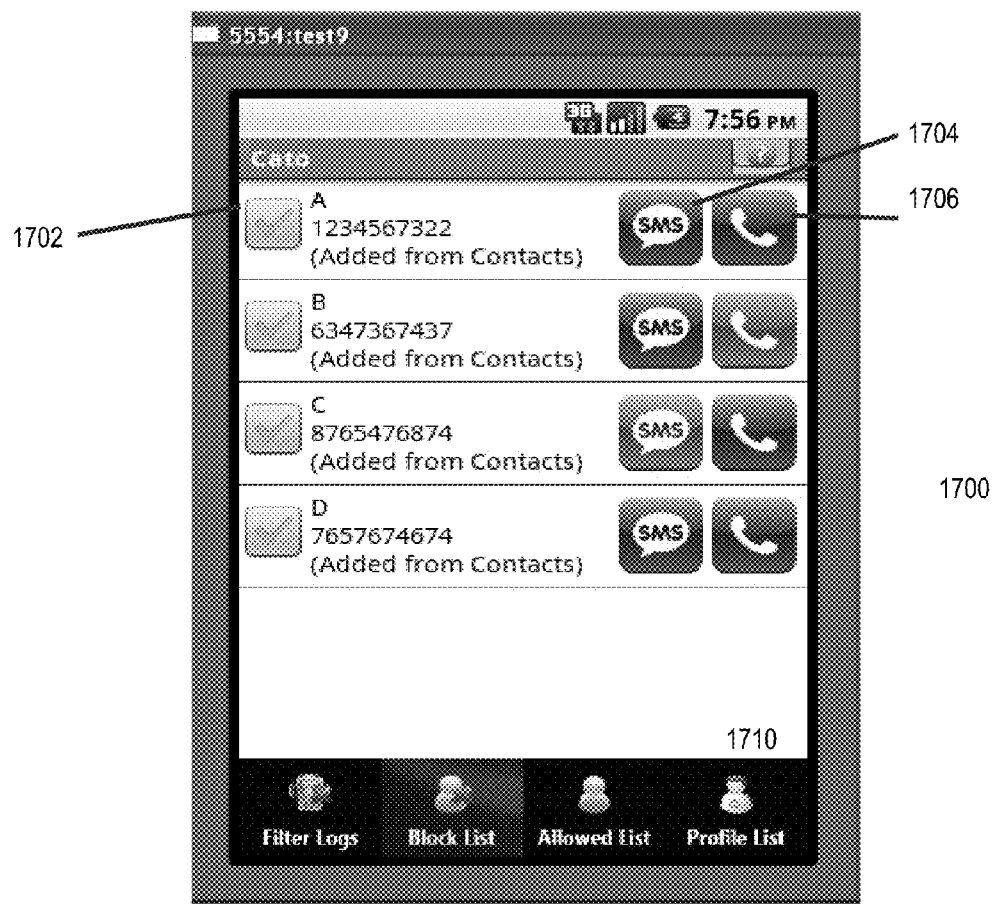
FIGS. 17-25 are schematic representations of screens and dialogs of a temporal incoming communication notification management app according to another exemplary embodiment of the present invention.

FIG. 17 is a schematic representation of an exemplary masked contact screen 1700 that may be displayed during a masked contacts activity. The masked contacts screen 1700 may be displayed with a title bar, a filter logs tab, the masked list tab, an allowed list tab, and further, with a profile list tab 1710. The masked contacts screen 1700 may include a list of phone numbers 1702 that may be temporally masked from receiving messages, calls, or both messages and calls. The phone numbers 1702 may be stored in a masked list table in a database. The masked contacts activity may retrieve, for all active profiles, all of the phone numbers 1702 stored in the masked list table of the database and display the phone numbers 1702. For each phone number 1702, the masked contacts screen 1700 may further include a text mask button 1704, a call mask button 1706, and a select button 1708. text mask buttons 1704 and call mask buttons 1706 may be red or green in color. The select button 1708 may contain a green checkmark if selected, or a faded checkmark if not selected.

If a text mask button 1704 is green, notification of incoming text messages from that phone number 1702 may occur according to a default notification routine of the smart phone. Similarly, if a phone mask button 1706 is green, notification of incoming phone calls from that phone number 1702 may occur according to a default notification routine.

If a text mask button 1704 is red, during a specified period, notification of text messages from that phone number 1702 may occur according to a password-protected masked notification routine. Similarly, if a phone mask button 1706 is red, during a specified period, notification of phone calls from that phone number 1702 may occur according to a password-protected masked notification routine.

Figure 18:

For a given phone number 1702, the text mask button 1704, the phone mask button 1706, or both the text mask button 1704 and call mask button 1706 may be red. In other words, a phone number may be temporally blocked for incoming phone calls and incoming text messages independently. If both the text mask button 1704 and the phone mask button 1706 are changed to green for a particular phone number, that phone number may be removed from the masked list table in the database. FIG. 18 is a schematic representation of a delete confirmation dialog 1800 that may displayed when both the text mask button 1704 and the phone mask button 1706 are both changed to green. The delete confirmation dialog 1800 includes a yes button 1802 and a no button 1804. If the yes button 1802 is selected, the contact is removed from the masked list table in the database.

Figure 19:
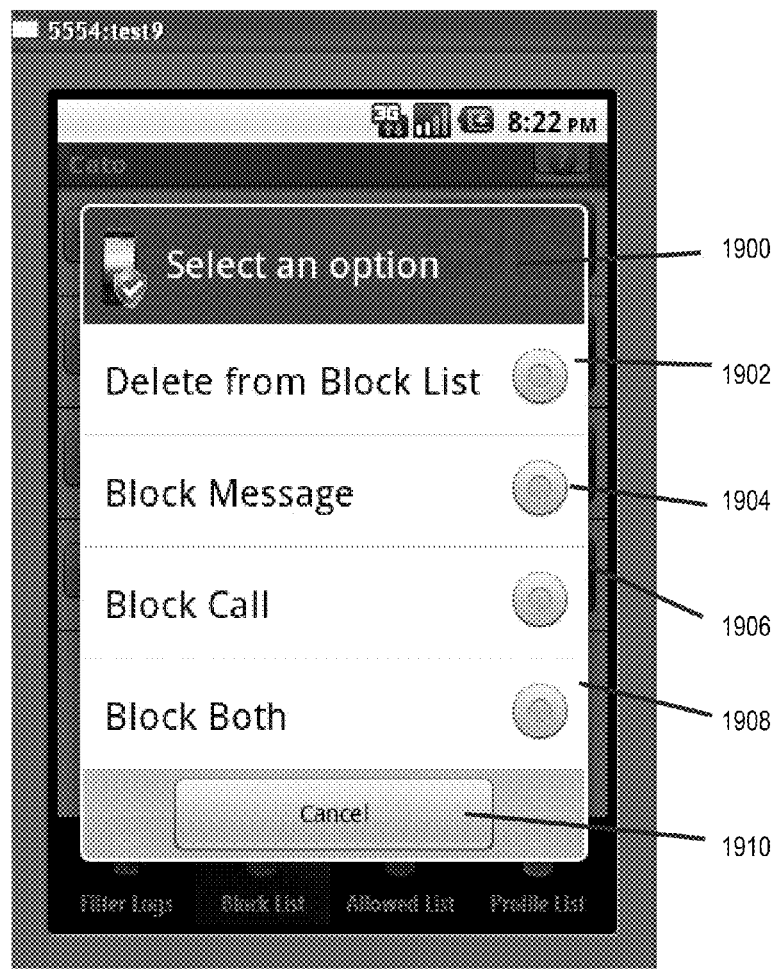

Upon selecting a single phone number 1702, a text mask button 1704, or a phone mask button 1706, a set single number block dialog may be displayed for the selected phone number. FIG. 19 is a schematic representation of an exemplary set single number mask dialog 1900. The set single number mask dialog 1900 may include a delete from masked list menu item 1902, a mask message menu item 1904, a mask call menu item 1906, a mask both menu item 1908, and a cancel button 1910. Upon selecting the delete from masked list menu item 1902, the phone number 1702 may be removed from the masked list table of the database. Upon selecting the mask message menu item 1904 or the mask call menu item 1906, the selected phone number 1702 may be added or remain on the masked list table indicating either text messages or phone calls, respectively, should be according to the password-protected masked notification routine. Upon selecting the mask both menu item 1908, the phone number 1702 may be added or remain on the masked list table indicating both text messages and phone calls should be according to the password protected masked notification routine. The text mask button 1704 and phone mask button 1706 for the selected phone number may be updated accordingly (displayed in green or red according to the user's selection).

Figure 20:

Upon selecting multiple phone numbers 1702 using select buttons 1708, a set multiple numbers mask dialog may be displayed for the selected phone numbers. FIG. 20 is a schematic representation of an exemplary set multiple numbers mask dialog 2000. The set multiple numbers block dialog 2000 may include a delete marked from masked list menu item 2002, a mask messages for marked menu item 2004, a mask call for marked menu item 2006, a mask both for marked menu item 2008, and a cancel button 2010. Upon selecting the delete marked from masked list menu item 2002, the selected phone numbers 1702 may be removed from the masked list table of the database. Upon selecting the mask message menu item 2004 or the mask call menu item 2006, the selected phone numbers 1702 may be added or remain on the masked list table indicating either text messages or phone calls, respectively, should be according to the password-protected masked notification routine. Upon selecting the mask both for marked menu item 2008, the selected phone number 1702 may be added or remain on the masked list table indicating both text messages and phone calls should be according to the password protected masked notification routine. The text mask button 1704 and phone mask button 1706 for each selected phone number 1702 may be updated accordingly (displayed in green or red according to the user's selection).

Figure 21:
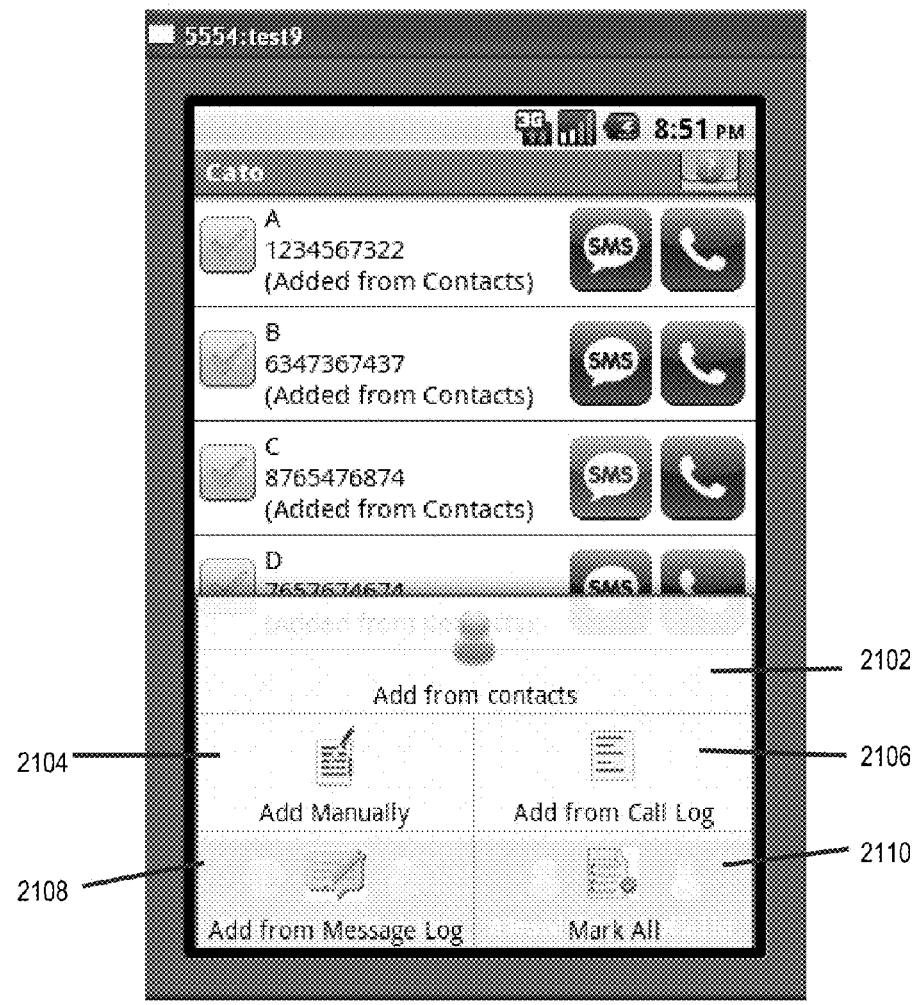

During the masked contacts activity, a user may select a menu button from a keypad of the smart phone. A list of menu items may be displayed. FIG. 21 is a schematic representation of an exemplary list of menu items. The list of menu items may include an add from contacts menu item 2102, an add manually menu item 2104, an add from call log menu item 2106, an add from message log menu item 2108, and a mark all menu item 2110. The add from contacts menu item 2102 may be selected to add contacts from the smart phone's contact list to the masked list table in the database. The add manually menu item 2104 may be selected to add a contact manually to the masked list table. The add from call log menu item 2106 may be selected to add contacts from the smart phone's call log. The add from message log menu item 2108 may be selected to add contacts from the smart phone's message log. The mark all menu item 2110 may be selected to select all or deselect all contacts.

Figure 22:
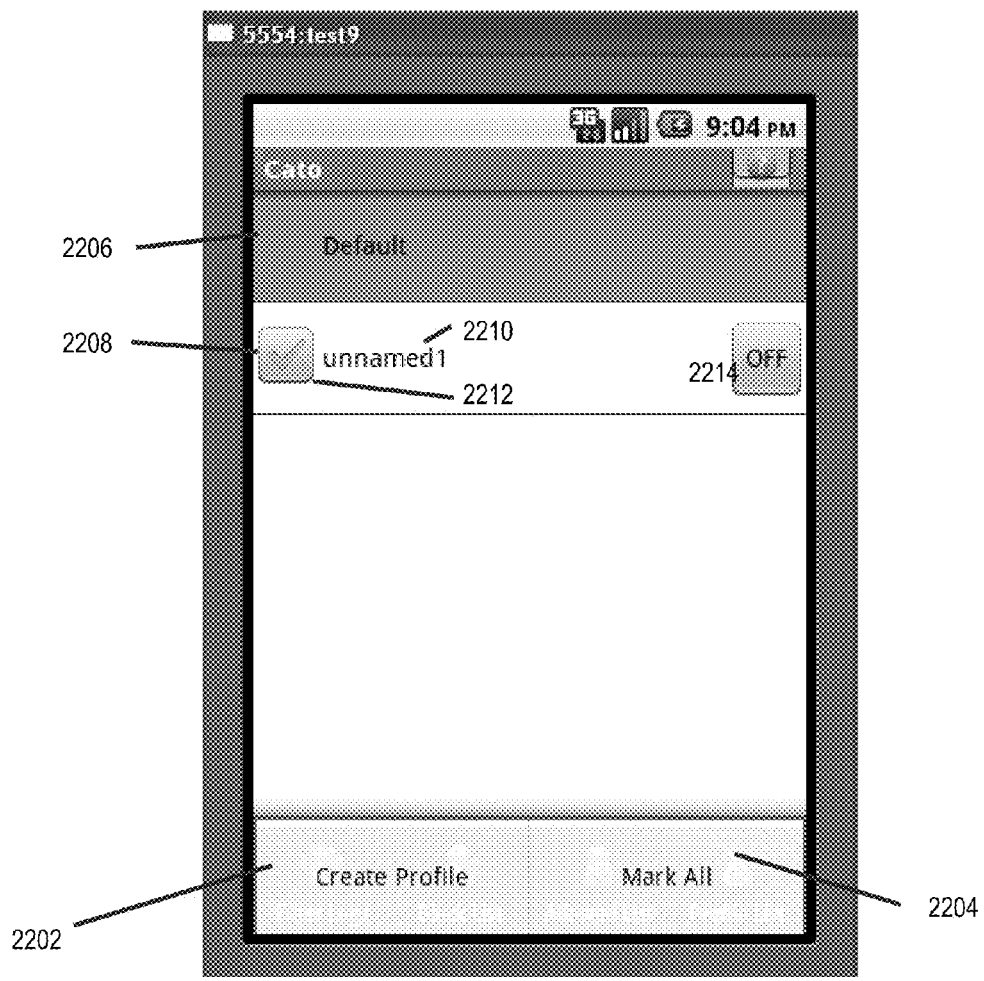

As noted above, the present embodiment may include a profile list tab 1710. Upon selecting the profile list tab 1710, a profile list screen may be displayed. FIG. 22 is a schematic representation of an exemplary profile list screen 2200. The profile list screen 2200 may be displayed with the title bar, the filter logs tab, the masked list tab, the allowed list tab, and the profile list tab. However, upon selecting the menu button of the keypad of the smart phone, a list of menu items may be displayed. As shown in FIG. 22, the list of menu items may be displayed over the filter logs tab, the masked list tab, the allowed list tab, and the profile list tab. The list of menu items may include a create profile menu item 2202 and a mark all menu item 2204.

The profile list screen 2200 may include a default profile 2206. The default profile 2206 may not be deleted. A user may create any number of additional profiles 2208 beyond the default profile 2206. A user may create an additional profile 2208 by selecting the create profile menu item 2202. The default profile 2206 may only be active when there is no other active additional profile 2208. However, multiple additional profiles 2208 may be active at the same time. Phone numbers 1702 may be added to one or more of the default profile 2206 and any additional profiles 2208.

Figure 23:
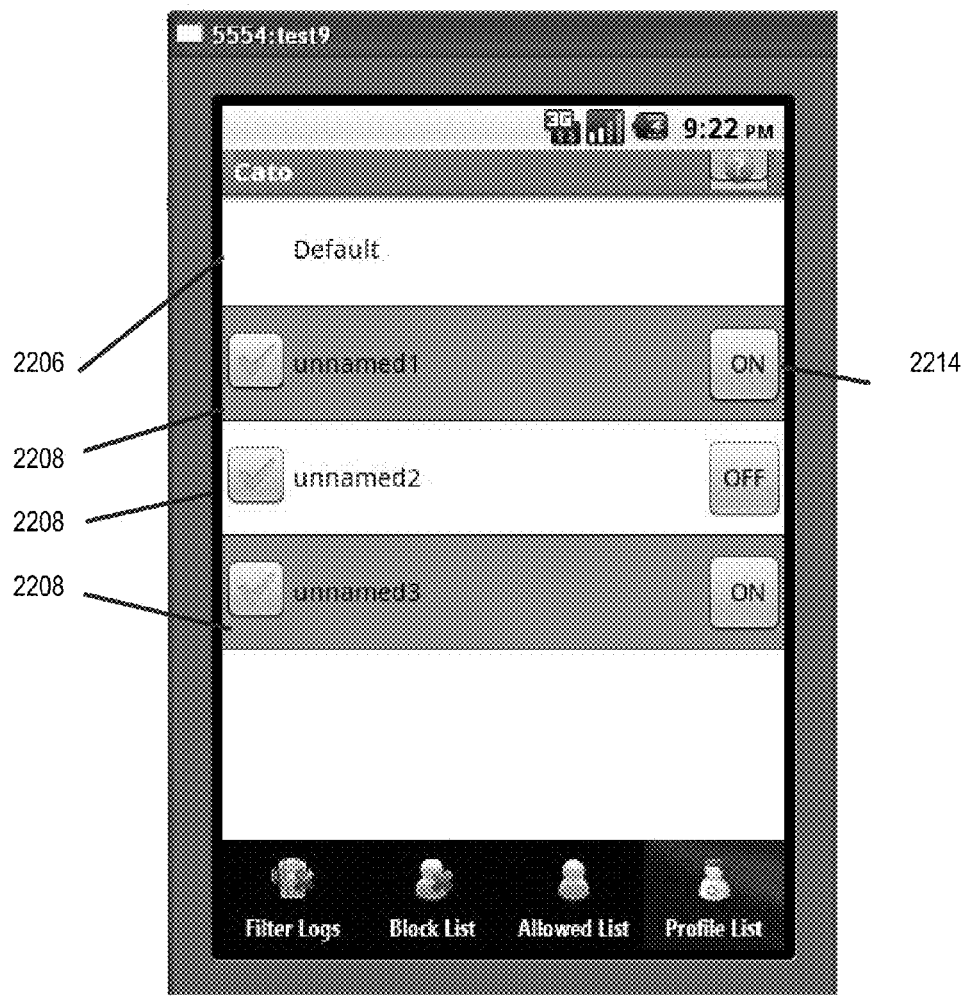

Each additional profile 2208 may include a profile identifier 2210, a select button 2212, and an ON/OFF button 2214. The select button may contain a green checkmark if selected, or a faded checkmark if not selected. If the additional profile 2208 is not activated, the ON/OFF button 2214 may display the text "OFF". As shown in FIG. 23, if the ON/OFF button 2214 is then selected, the additional profile 2208 may be activated and the ON/OFF button 2214 may display the text "ON", and the background of the active profiles may be highlighted. When one or more additional profiles 2208 are activated, the default profile 2206 may be inactive. As shown in FIG. 23, additional profiles 2208 unnamed 1 and unnamed 3 are active while default profile 2206 and additional profile 2208 unnamed 2 are inactive.

Additional profiles 2208 may be deleted and settings of default profile 2206 and any additional profiles 2208 may be may reviewed by selecting on the profile and selecting a desired option from a dialog that may appear after selecting the profile.

Figure 24:
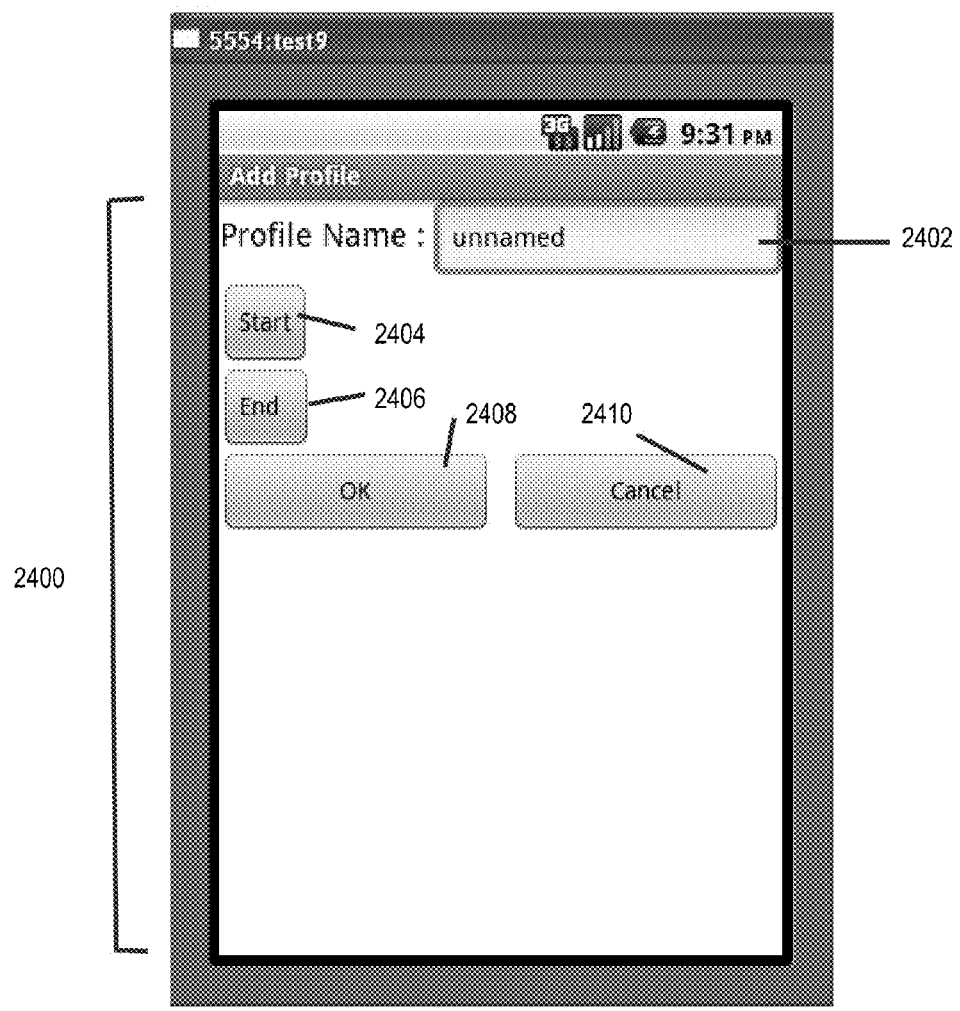

Upon selecting the create profile menu item 2202, an add profile screen may be displayed. FIG. 24 is a schematic representation of an exemplary add profile screen 2400. The add profile screen 2400 may include a name input field 2402, a start button 2404, an end button 2406, an OK button 2408, and a cancel button 2410. When the start button 2404 is selected, a profile start date and time may be entered. When the end button 2406 is selected, a profile stop date and time may be entered. A user may select the OK button 2408 to confirm the selections.

Figure 25:
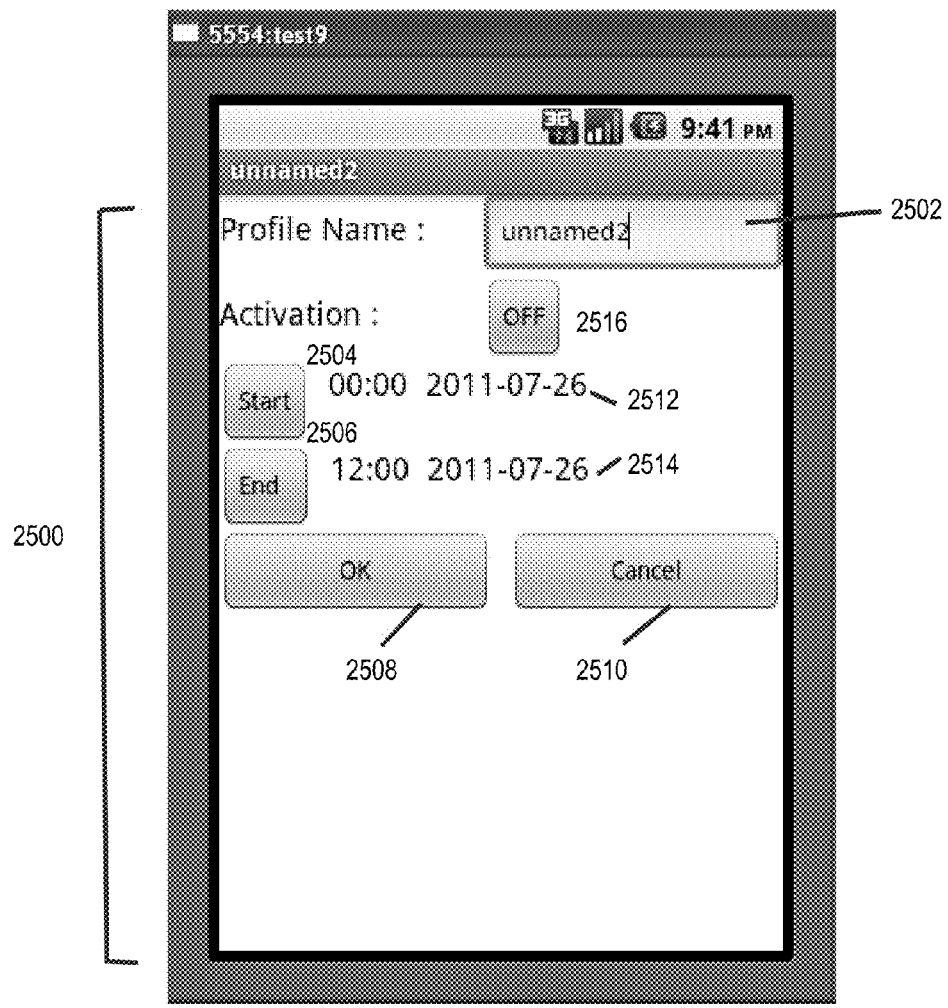

Upon selecting the default profile 2206 or any additional profile 2208, a settings screen may be displayed. FIG. 25 is a schematic representation of an exemplary settings screen 2500. The settings screen 2500 may include a name field 2502, a start button 2504, an end button 2506, an OK button 2508, a cancel button 2510, an activation button 2516, a start date and time indicator 2512 and an end date and time indicator 2514. When the activation button 2516 is selected, the profile may be activated, and filtering may occur during the specified period. The start and end date and time indicators 2512, 2514 may indicate the starting and ending time during which period calls associated with the particular profile (either on the masked list or the allowed list) may be filtered.

FIGS. 26-30 are schematic representations of a temporal incoming communication notification management app according to another exemplary embodiment. Certain elements may be similar to the above exemplary embodiments and a discussion thereof is omitted in the interest clarity. Instead, only some similar elements are discussed along with certain differences. In this exemplary embodiment, SMS and MMS messages may be masked, and temporal time periods may be managed through the use of profiles.

Figure 26:
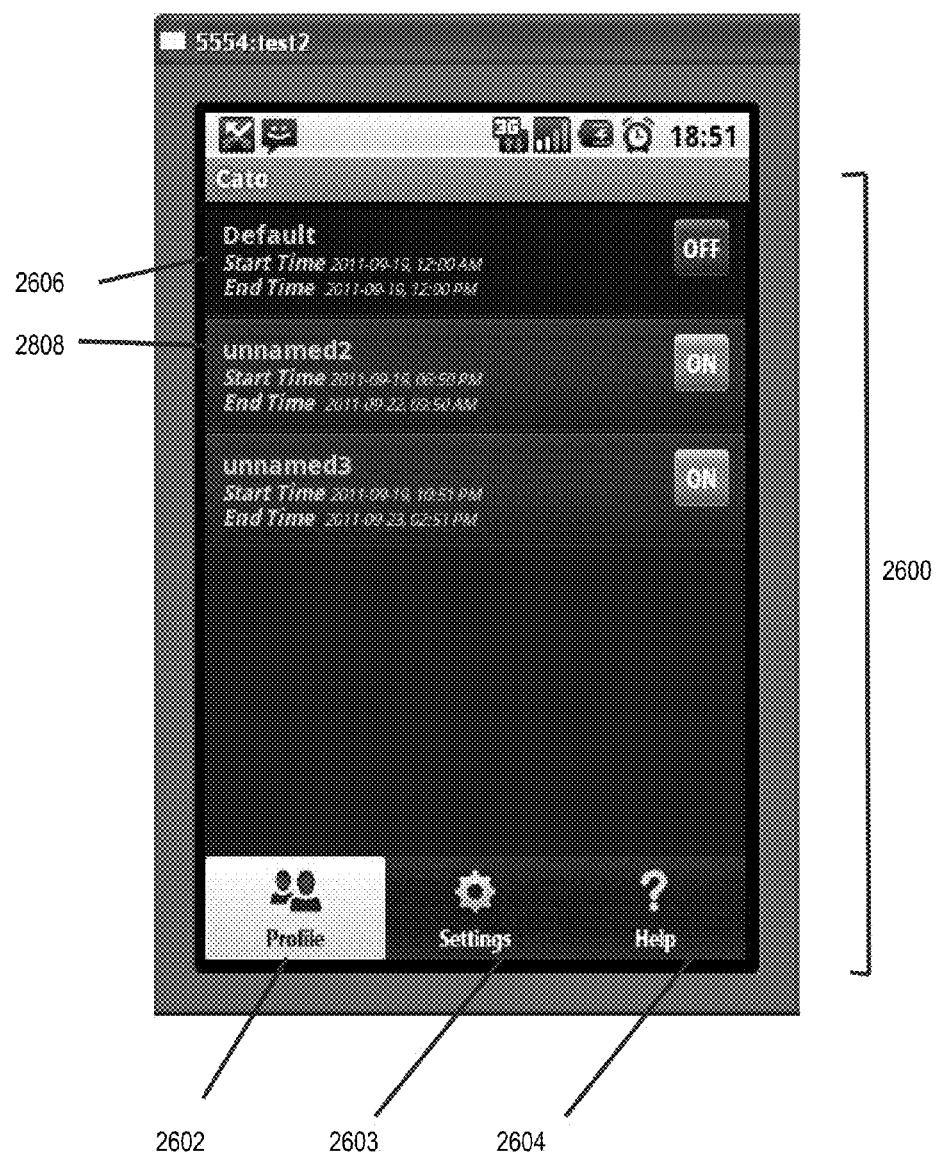
FIGS. 26-30 are schematic representations of screens of a temporal incoming communication notification management app according to another exemplary embodiment of the present invention.
Figure 27:
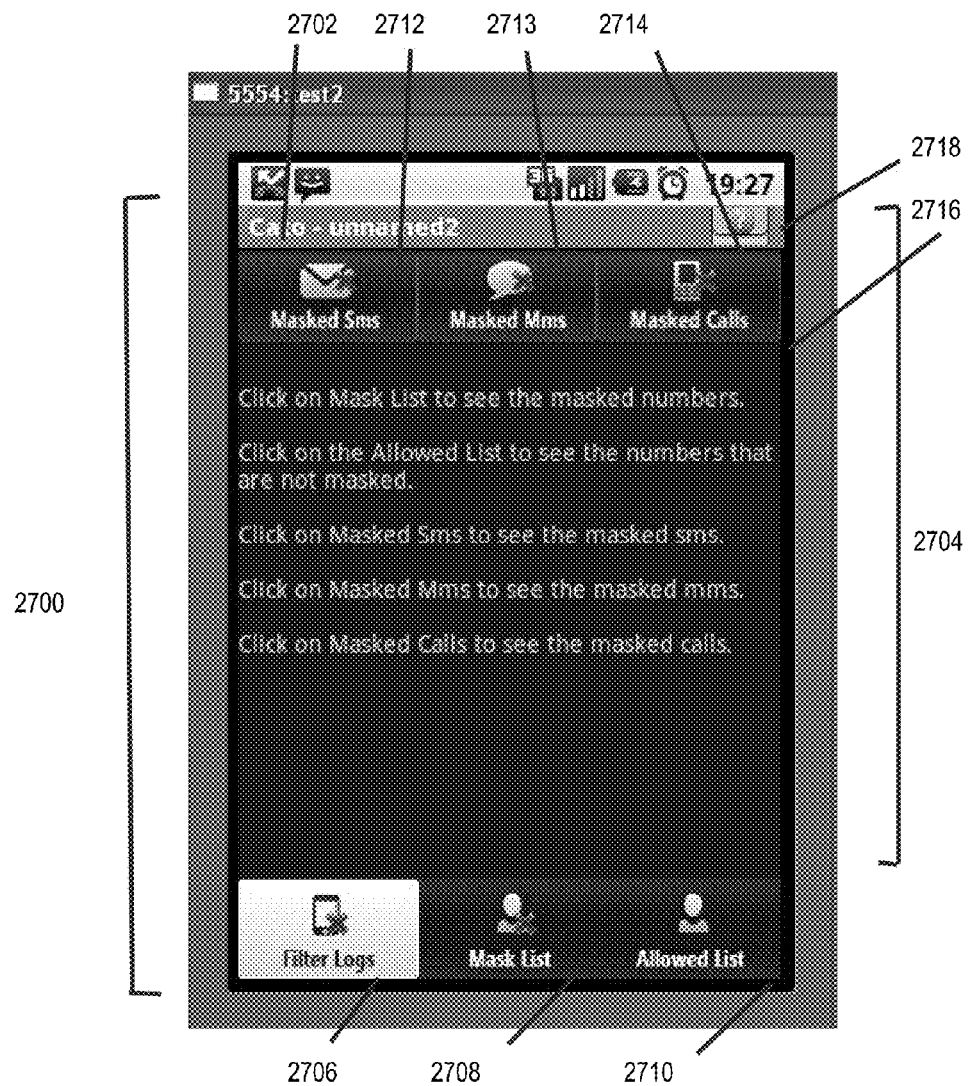

During a launch of the temporal incoming communication notification management app, after prompting a user for a password, a profile list screen may be displayed. FIG. 26 is a schematic representation of an exemplary profile list screen 2600. The profile list screen 2600 may be displayed with a title bar, a profile tab 2602, a settings tab 2603, and a help tab 2604. The profile list screen 2600 may include a default profile 2206. The default profile 2206 may not be deleted. The profile list screen 2600 may include additional profiles 2208 beyond the default profile 2206. Once a user selects either the default profile 2606 or one of the additional profiles 2208, a corresponding main activity may start. In the main activity, a main user interface may be displayed. FIG. 27 is a schematic representation of a main user interface 2700. The main user interface 2700 may include a title bar 2702, a main screen 2704, a filter logs tab 2706, a masked list tab 2708, and an allowed list tab 2710. The filter logs tab 2706 may be in a selected state, and the main screen 2704 may include a masked SMS button 2712, a masked MMS button 2713, a masked calls button 2714, and a display area 2716. The title bar 2702 may include a help button 2718.

Upon selecting the masked SMS button 2712, the masked MMS button 2713, or the masked calls button 2714 for the first time, a set password activity may start. Otherwise, upon selecting the masked SMS button 2712, the masked MMS button 2713, or the masked calls button 2714, a password for logs activity may start. If passwords match during the password for logs activity, a messages from database activity may be started (if the masked SMS button 2712 was selected) or a MMS from database activity may be started (if the masked MMS button 2713 was selected). In the messages from database activity and in the MMS from database activity, a masked messages screen may be displayed displaying either masked SMS messages, masked MMS messages, or both masked SMS and MMS messages. In an alternative exemplary embodiment, single messages from database activity may be used for both masked SMS and MMS messages. It should be noted that SMS messages, MMS messages, and phone calls may be temporally authorized independently of one another for a particular phone number.

Figure 28:
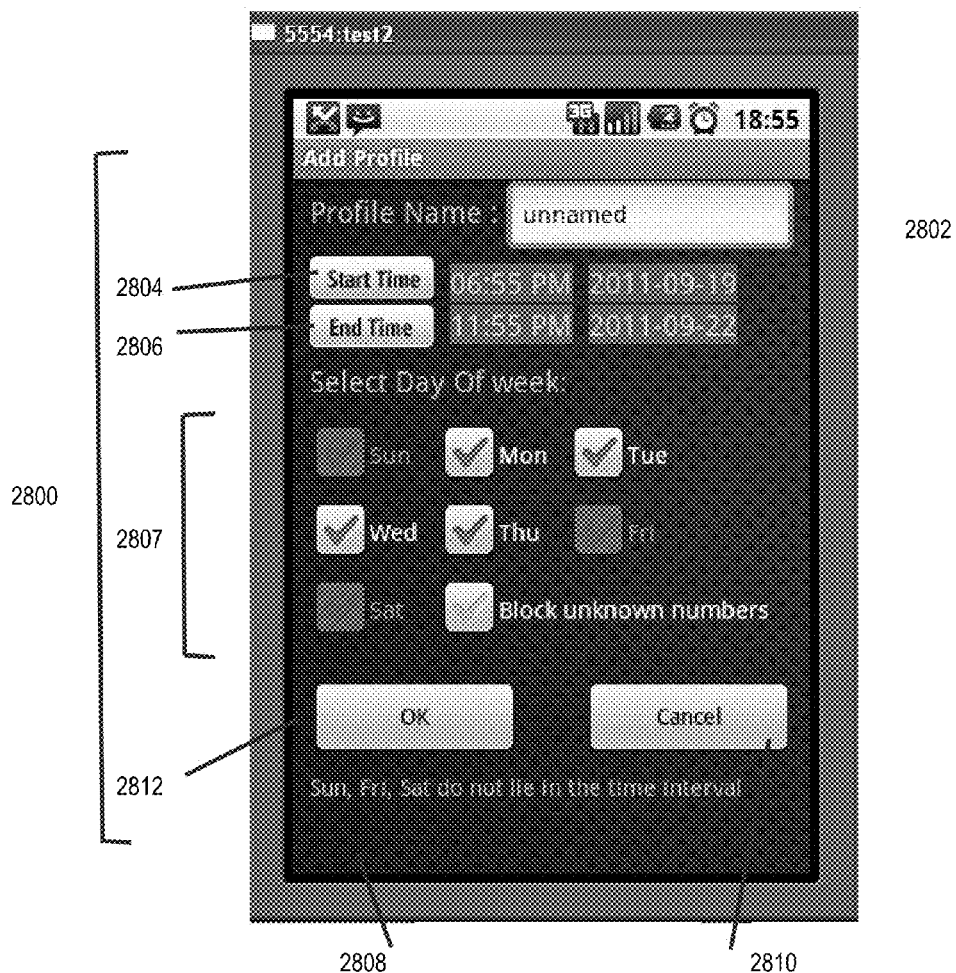

As noted above, the present exemplary embodiment includes a profile tab 2602. Upon selecting the profile tab 2602, the profile list screen 2600 may be displayed. Upon selecting a create profile menu item (not shown), an add profile screen may be displayed. FIG. 28 is a schematic representation of an exemplary add profile screen 2800. The add profile screen 2800 may include a name input field 2802, a start time button 2804, an end time button 2806, day select buttons 2807, an OK button 2808, a cancel button 2810, and a block unknown numbers select button 2812. Start and end times and days may be displayed. When the start time button 2804 is selected, a profile start time may be entered. When the end time button 2806 is selected, a profile stop time may be entered. Certain days of the week during which the profile start and stop times (i.e., the profile) should be active may be selected using the day select buttons 2807. A user may choose to mask unknown numbers during the profile active time by selecting the block unknown numbers select button 2812. The principles and spirit of the invention may be implemented by providing additional screening filters. For example, calls from a certain number during a certain time period may be screened or added to the masked list. Calls during a certain time may be screened or added to the list. International calls, calls from a particular country, calls from a particular area code, or caller ID blocked calls may each be screened or added to the masked list. Similarly, texts or pictures from or linking to a particular domain or IP address may be screened or added to the masked list. A user may select the OK button 2408 to confirm the selections.

Figure 29:
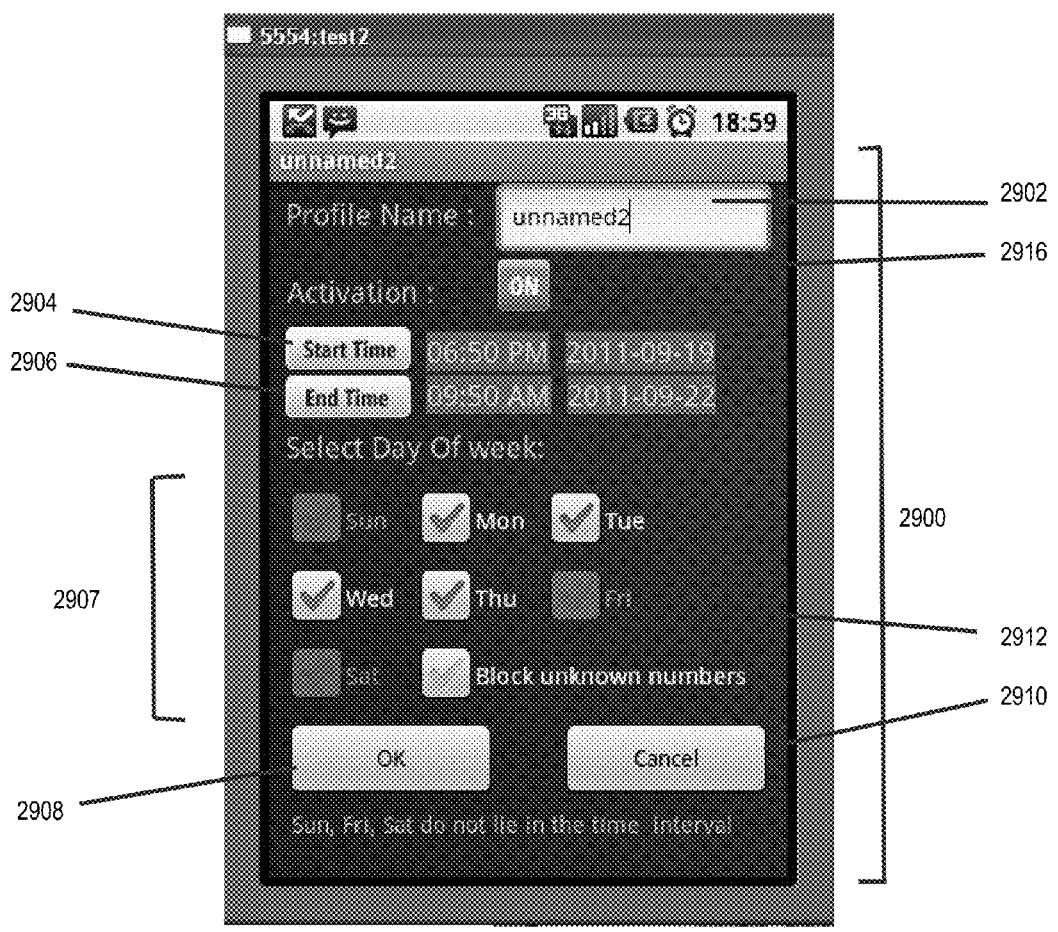

From the profile list screen 2600, upon selecting the default profile 2606 or any additional profile 2608, a profile settings screen may be displayed. FIG. 29 is a schematic representation of an exemplary profile settings screen 2900. The profile settings screen 2900 may include a name field 2902, a start time button 2904, an end time button 2906, day select buttons 2907, an OK button 2908, a cancel button 2910, a block unknown numbers select button 2912, and an activation button 2916. When the activation button 2916 is selected, the profile may be activated, and filtering may occur during the specified period. Start and end times and days may be displayed. When the profile is active and during the specified times and days, text messages or calls associated with the particular profile (either on the masked list or the allowed list or unknown if applicable) may be filtered.

Figure 30:
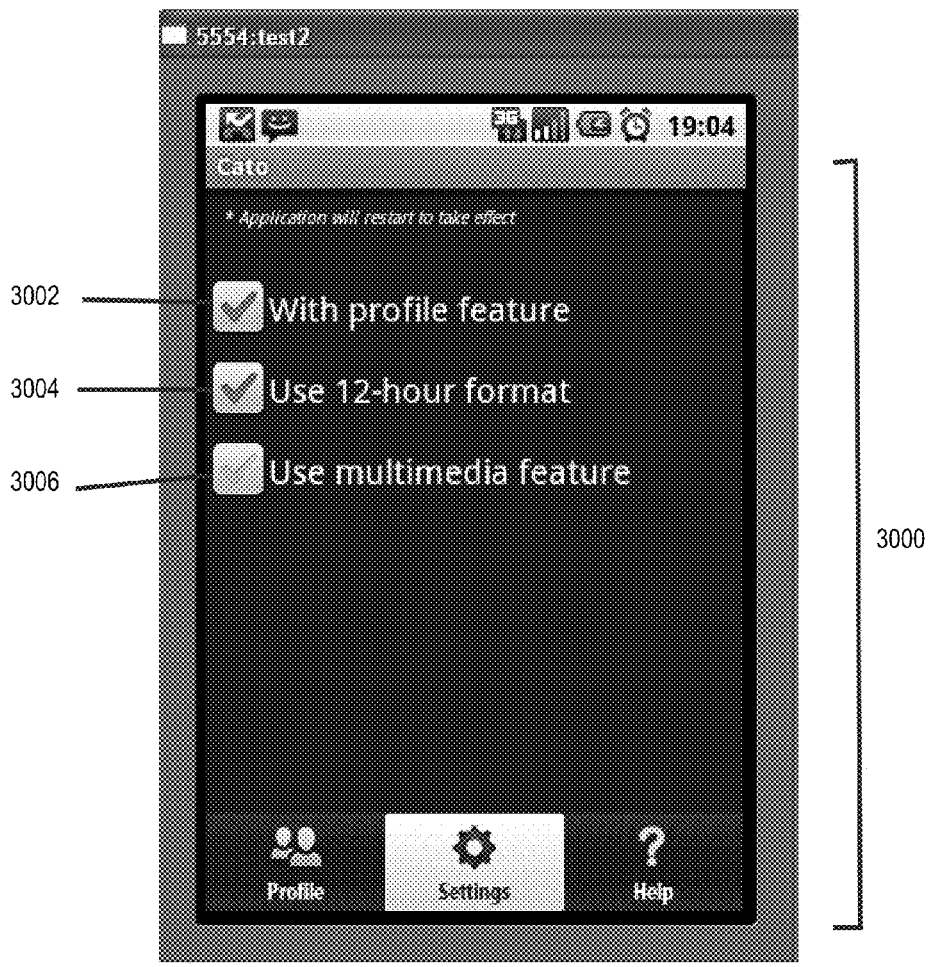

As noted above, the present exemplary embodiment includes a settings tab 2603. Upon selecting the settings tab 2603, an app settings screen may be displayed. FIG. 30 is a schematic representation of an exemplary app settings screen 3000. The app settings screen 3000 may include a with profile feature select button 3002, a use 12-hour format button 3004, and a use multimedia feature button 3006. If the with profile feature select button is selected, multiple profiles may be enabled. If the use 12-hour format button 3004 is select button is selected, times in the app may be in a 12 hour format (as opposed to a 24 hour format). If the use multimedia feature select button 3006 is selected, then MMS messages may be filtered.

Figure 31:
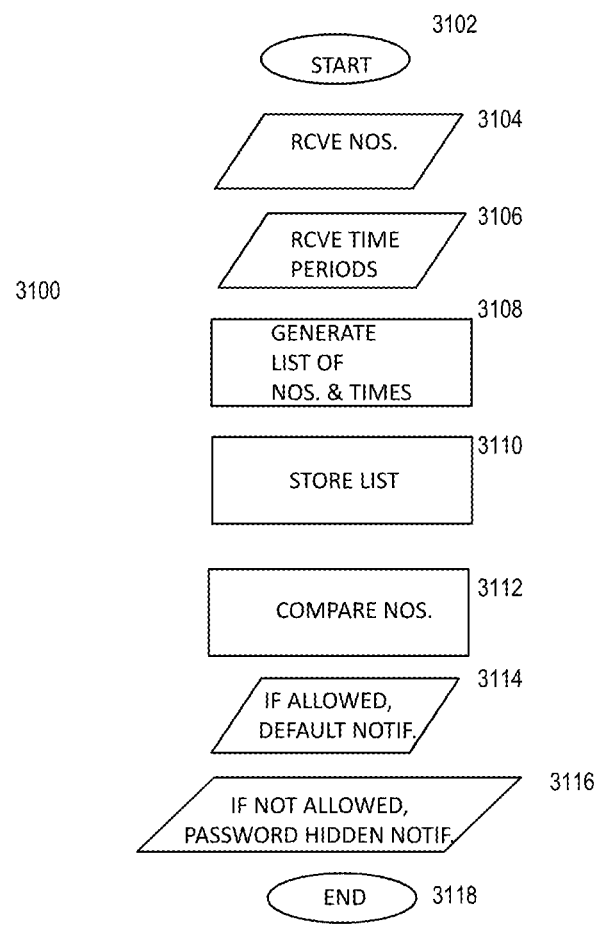
FIG. 31 is a schematic representation of a method of a smartphone according to an exemplary embodiment of the present invention.

The operation of the exemplary embodiments is now described with reference to FIG. 31 which is a schematic representation of an exemplary method 3100 of a smartphone. In operation 3102, the method 3100 may begin. In operation 3104, indications of temporally authorized or unauthorized phone numbers may be received into a user interface of the smart phone. In operation 3106, indications of time periods during which the temporally authorized or unauthorized phone numbers are temporally authorized or unauthorized may be received into the user interface of the smart phone. In operation 3108, a list of temporally authorized or unauthorized phone numbers and time periods may be generated based on said received indications of temporally authorized or unauthorized phone numbers and time periods. In operation 3110, the list of temporally authorized or unauthorized phone numbers and time periods may be stored in the memory of the smart phone.

In operation 3112, phone, phone numbers and times of incoming phone calls and incoming text messages may be compared against the list of temporally authorized or unauthorized phone numbers and time periods. If the a number of an incoming phone call or incoming text message and is temporally allowed, in operation 3114, notification of the incoming phone call or incoming text messages may be according to a default notification routine of the smart phone. If the number of the incoming phone call or incoming text message is not temporally allowed, in operation 3116, notification of the incoming phone call or incoming text according to the default notification routine may not occur and a notification of the incoming call or incoming text according to a password-protected masked notification routine of the smart phone may be generated. The default notification routine of the smart phone includes immediately displaying incoming phone call or incoming text message information on the display of the smart phone and adding an indication of the incoming phone call or incoming text message to a default phone log or message log of the smart phone. The password-protected masked notification routine of the smart phone includes adding an indication of the incoming phone call or incoming text message to a password-protected phone log or message log of the smart phone and precludes immediately displaying the incoming phone call or incoming text message information on the display of the smart phone, and further does not include adding an indication of the incoming phone call or incoming text message to a default phone log or message log of the smart phone. In operation 3118, the method 3100 may end.

Embodiments of the present invention allow for temporal incoming communication management. Accordingly, certain incoming phone calls and text messages may not be handled according to a default notification routine of a smart phone, but may be discretely handled according to a password protected masked notification routine. This may provide a user increased privacy, and increased control over the user's time and communications. In some instances, this may eliminate a user's need for multiple phones (e.g., separate work and personal phones).

The foregoing description discloses only exemplary embodiments of the invention. Modifications of the above-disclosed embodiments of the present invention of which fall within the scope of the invention will be readily apparent to those of ordinary skill in the art. For example, although operations are described with reference to particular activities, the operations could be a part of more or fewer or different activities. Further, as noted above, the principles and spirit of the invention may be implemented using alternatives to, for example, activities. Further, specific interfaces and the like are described for clarity. For example, although the use of select buttons containing green check marks has been described, alternative selectors may be used.

Accordingly, although exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of a smart phone including a processor, a memory coupled to the processor, and a display, the method comprising:
    receiving into a user interface of the smart phone, indications of temporally authorized or unauthorized phone numbers;
    receiving into the user interface of the smart phone, indications of time periods during which the temporally authorized or unauthorized phone numbers are temporally authorized or unauthorized;
    generating a list of temporally authorized or unauthorized phone numbers and time periods based on said received indications of temporally authorized or unauthorized phone numbers and time periods;
    storing the list of temporally authorized or unauthorized phone numbers and time periods in the memory of the smart phone;
    comparing, using instructions executed by the processor of the smart phone, phone numbers and times of incoming phone calls and incoming text messages against the list of temporally authorized or unauthorized phone numbers and time periods;
    if a number of an incoming phone call or incoming text message and is temporally allowed, allowing for notification of the incoming phone call or incoming text messages according to a default notification routine of the smart phone; and
    if the number of the incoming phone call or incoming text message is not temporally allowed, not allowing for notification of the incoming phone call or incoming text according to the normal notification routine and generating a notification of the incoming call or incoming text according to a password-protected masked notification routine of the smart phone,
    wherein the default notification routine of the smart phone includes immediately displaying incoming phone call or incoming text message information on the display of the smart phone and adding an indication of the incoming phone call or incoming text message to a default phone log or message log of the smart phone, and
    wherein the password-protected masked notification routine of the smart phone includes adding an indication of the incoming phone call or incoming text message to a password-protected phone log or message log of the smart phone and precludes immediately displaying the incoming phone call or incoming text message information on the display of the smart phone, and further precludes adding an indication of the incoming phone call or incoming text message to a default phone log or message log of the smart phone.

2. The method of claim 1, wherein the times of incoming phone calls and incoming text messages includes a calendar date.

3. The method of claim 1, wherein a temporally authorized or unauthorized phone number is temporally authorized or unauthorized for incoming phone calls and incoming text messages independently.

4. The method of claim 1, further comprising:
    storing an encrypted password;
    receiving an entered password; and
    if the number of the incoming phone call or incoming text message is not temporally allowed, displaying the indication of the incoming phone call or incoming text message only if the encrypted password and entered password match.

5. The method of claim 4, further comprising:
    storing a second encrypted password;
    receiving a second entered password; and
    if the number of the incoming phone call or incoming text message is not temporally allowed, displaying the indication of the incoming phone call or incoming text message only if the second encrypted password and second entered password match.

6. The method of claim 1, wherein the receiving operations, generating operation, storing operation, comparing operation, and allowing for notification operation are controlled by a smart phone app.

7. The method of claim 1, wherein the receiving operations, generating operation, storing operation, comparing operation, and allowing for notification operation are controlled by a smart phone operating system.

8. The method of claim 1, wherein the incoming text messages include SMS messages.

9. The method of claim 1, wherein the incoming text messages include MMS messages.

10. The method of claim 1, wherein the password-protected masked notification routine of the smartphone further precludes audible indication of the incoming phone call or incoming text message.

11. A non-transitory smart phone computer app having instructions that when received from memory into a processor cause the smart phone to implement a method, the method comprising:
    receiving into a user interface of the smart phone, indications of temporally authorized or unauthorized phone numbers;
    receiving into the user interface of the smart phone, indications of time periods during which the temporally authorized or unauthorized phone numbers are temporally authorized or unauthorized;
    generating a list of temporally authorized or unauthorized phone numbers and time periods based on said received indications of temporally authorized or unauthorized phone numbers and time periods;
    storing the list of temporally authorized or unauthorized phone numbers and time periods in the memory of the smart phone;
    comparing, using instructions executed by the processor of the smart phone, phone numbers and times of incoming phone calls and incoming text messages against the list of temporally authorized or unauthorized phone numbers and time periods;
    if the a number of an incoming phone call or incoming text message and is temporally allowed, allowing for notification of the incoming phone call or incoming text messages according to a default notification routine of the smart phone; and if the number of the incoming phone call or incoming text message is not temporally allowed, not allowing for notification of the incoming phone call or incoming text according to the normal notification routine and generating a notification of the incoming call or incoming text according to a password-protected masked notification routine of the smart phone, wherein the default notification routine of the smart phone includes immediately displaying incoming phone call or incoming text message information on the display of the smart phone and adding an indication of the incoming phone call or incoming text message to a default phone log or message log of the smart phone, and wherein the password-protected masked notification routine of the smart phone includes adding an indication of the incoming phone call or incoming text message to a password-protected phone log or message log of the smart phone and precludes immediately displaying the incoming phone call or incoming text message information on the display of the smart phone, and further precludes adding an indication of the incoming phone call or incoming text message to a default phone log or message log of the smart phone.

12. The app of claim 11, wherein the times of incoming phone calls and incoming text messages includes a calendar date.

13. The app of claim 11, wherein a temporally authorized or unauthorized phone number is temporally authorized or unauthorized for incoming phone calls and incoming text messages independently.

14. The app of claim 11, where in the method further comprises:
    storing an encrypted password;
    receiving an entered password; and
    if the number of the incoming phone call or incoming text message is not temporally allowed, displaying the indication of the incoming phone call or incoming text message only if the encrypted password and entered password match.

15. The app of claim 14, wherein the method further comprises:
    storing a second encrypted password;
    receiving a second entered password; and
    if the number of the incoming phone call or incoming text message is not temporally allowed, displaying the indication of the incoming phone call or incoming text message only if the second encrypted password and second entered password match.

16. The app of claim 11, wherein the app is installed on the smartphone.

17. The app of claim 11, wherein the app is integrated as part of an operating system of the smartphone.

18. The app of claim 11, wherein the incoming text messages include SMS messages.

19. The app of claim 11, wherein the incoming text messages include MMS messages.

20. The app of claim 11, wherein the password-protected masked notification routine of the smartphone further precludes audible indication of the incoming phone call or incoming text message.

* * * * *